United States Patent
Ying

(10) Patent No.: US 12,199,786 B2
(45) Date of Patent: Jan. 14, 2025

(54) COMMUNICATION METHOD AND APPARATUS

(71) Applicant: Huawei Technologies Co., Ltd., Shenzhen (CN)

(72) Inventor: Jiangwei Ying, Beijing (CN)

(73) Assignee: HUAWEI TECHNOLGIES CO., LTD., Shenzhen (CN)

( * ) Notice: Subject to any disclaimer, the term of this patent is extended or adjusted under 35 U.S.C. 154(b) by 415 days.

(21) Appl. No.: 17/552,697

(22) Filed: Dec. 16, 2021

(65) Prior Publication Data
US 2022/0109586 A1    Apr. 7, 2022

Related U.S. Application Data

(63) Continuation of application No. PCT/CN2020/096203, filed on Jun. 15, 2020.

(30) Foreign Application Priority Data

Jun. 17, 2019    (CN) .......................... 201910523810.8

(51) Int. Cl.
*H04W 4/40*    (2018.01)
*H04L 1/1812*    (2023.01)
(Continued)

(52) U.S. Cl.
CPC ........ *H04L 12/1868* (2013.01); *H04L 1/1812* (2013.01); *H04L 12/1881* (2013.01); *H04W 4/06* (2013.01); *H04W 4/40* (2018.02)

(58) Field of Classification Search
CPC ............. H04L 12/1868; H04L 12/1881; H04L 1/1812; H04W 4/40; H04W 4/06
See application file for complete search history.

(56) References Cited

U.S. PATENT DOCUMENTS 10,805,395 B2    10/2020  Cavalcanti et al.
11,012,886 B2     5/2021  Wang et al.
(Continued)

FOREIGN PATENT DOCUMENTS

CN    105246025 A    1/2016
CN    107040898 A    8/2017
(Continued)

OTHER PUBLICATIONS

"3rd Generation Partnership Project; Technical Specification Group Services and System Aspects; Study on architecture enhancements for the Evolved Packet System (EPS) and the 5G System (5GS) to support advanced V2X services (Release 16)," 3GPP TR 23.786 V16.1.0, Jun. 2019, 119 pages.
(Continued)

*Primary Examiner* — Erika A Washington
(74) *Attorney, Agent, or Firm* — SLATER MATSIL, LLP

(57) ABSTRACT

A communication apparatus and method the method including receiving, by an access stratum (AS) of a terminal, a groupcast message, where the terminal corresponds to a member in a group, determining, by the AS of the terminal, a feedback resource based on a sequence number of the member, and sending, by the AS of the terminal, an acknowledgement (ACK)/negative acknowledgement (NACK) message of the groupcast message based on the feedback resource.

20 Claims, 19 Drawing Sheets

(51) Int. Cl.
*H04L 12/18* (2006.01)
*H04W 4/06* (2009.01)

(56) References Cited

U.S. PATENT DOCUMENTS

| | | | |
|---|---|---|---|
| 11,178,667 | B2 | 11/2021 | Sartori et al. |
| 2013/0250838 | A1 | 9/2013 | Liang et al. |
| 2019/0052436 | A1 | 2/2019 | Desai et al. |
| 2019/0116467 | A1 | 4/2019 | Belleschi et al. |
| 2020/0389257 | A1* | 12/2020 | Kung ............... H04W 4/06 |
| 2022/0007231 | A1* | 1/2022 | Basu Mallick ... H04W 28/0289 |

FOREIGN PATENT DOCUMENTS

| | | |
|---|---|---|
| CN | 107710795 A | 2/2018 |
| CN | 108605362 A | 9/2018 |
| CN | 108990125 A | 12/2018 |
| CN | 109547168 A | 3/2019 |
| WO | 2019096275 A1 | 5/2019 |

OTHER PUBLICATIONS

"3rd Generation Partnership Project; Technical Specification Group Services and System Aspects; Architecture enhancements for 5G System (5GS) to support Vehicle-to-Everything (V2X) services (Release 16)," 3GPP TS 23.287 V1.0.0, May 2019, 47 pages.

"3rd Generation Partnership Project; Technical Specification Group Radio Access Network; NR; Multiplexing and channel coding (Release 15)," 3GPP TS 38.212 V15.5.0, Mar. 2019, 101 pages.

"3rd Generation Partnership Project; Technical Specification Group Radio Access Network; NR; Physical layer procedures for control (Release 15)," 3GPP TS 38.213 V15.5.0, Mar. 2019, 104 pages.

"3rd Generation Partnership Project; Technical Specification Group Radio Access Network; NR; Physical layer procedures for data (Release 15)," 3GPP TS 38.214 V15.5.0, Mar. 2019, 103 pages.

"3rd Generation Partnership Project;Technical Specification Group Radio Access Network; NR; Medium Access Control (MAC) protocol specification (Release 15)," 3GPP TS 38.321 V15.5.0, Mar. 2019, 78 pages.

"Support of NR Sidelink Unicast and Groupcast," Agenda Item: 7.2.4.1.1, Source: InterDigital Inc., Document for: Discussion and Decision, 3GPP TSG RAN WG1 Meeting #94bis, R1-1811209, Chengdu, China, Oct. 8-12, 2018, 5 pages.

"Discussion on Groupcast for NR V2X," Agenda Item: 11.4.2.3, Source: Qualcomm Incorporated, Document for: Discussion, Decision, 3GPP TSG-RAN WG2 Meeting #104, R2-1817780, Spokane, United States, Nov. 12-16, 2018, 6 pages.

"A V2X Group Member Discovery for Groupcast Communication," Source: Huawei, HiSilicon, Document for: Approval, Agenda Item: 6.6.2, Work Item / Release: eV2XARC / Rel-16, 3GPP TSG-SA WG2 Meeting #134, S2-1907629, (Revision of S2-190xxxx), Jun. 24-Jun. 28, 2019, Sapporo, Japan, 8 pages.

* cited by examiner

S106. Quantity of the one or more reachable members

S107. Second message

S108. Obtain the quantity of the one or more reachable members based on the second message S109. Quantity of the one or more reachable members

CONT. FROM FIG. 4A

FIG. 4B

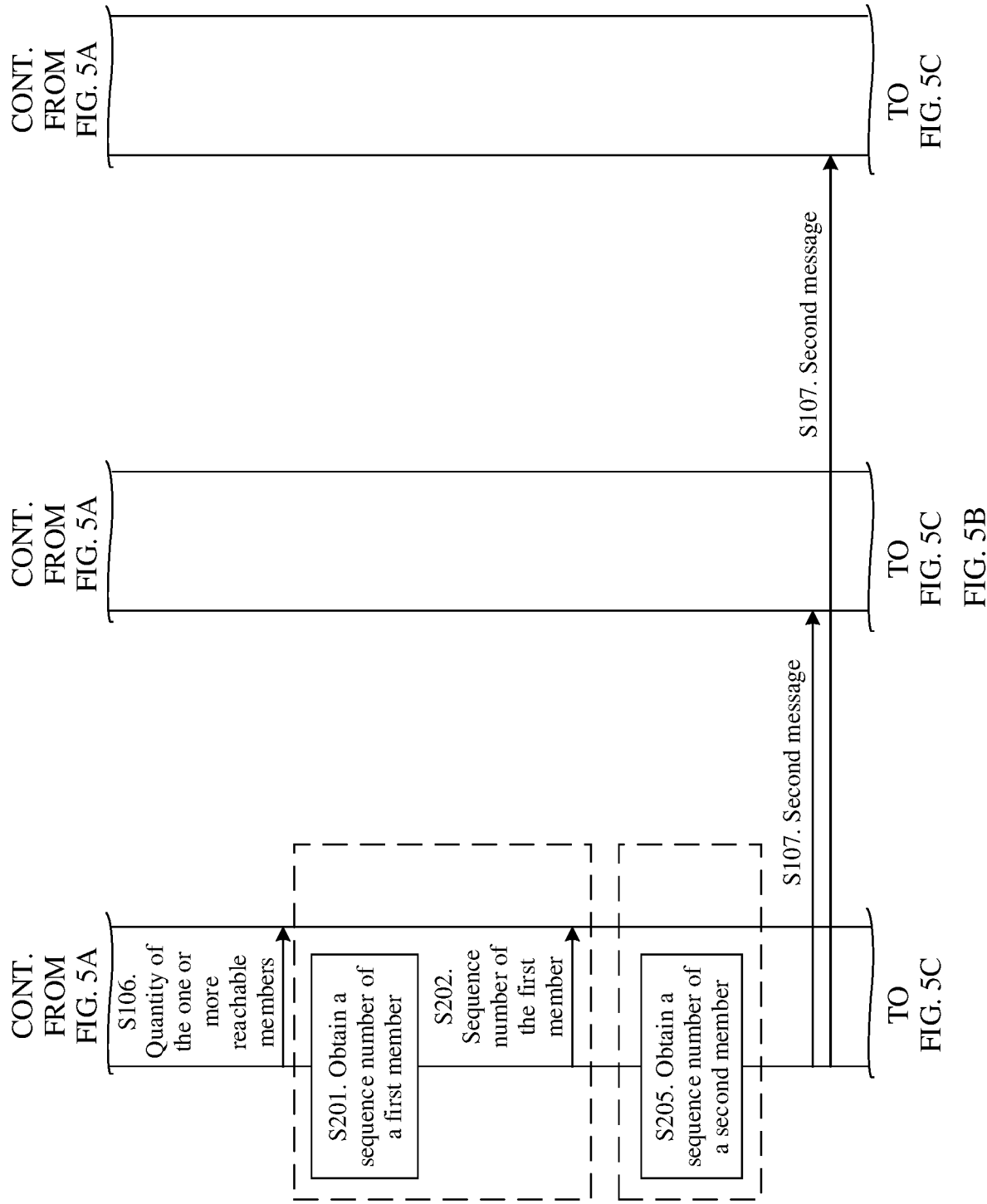

FIG. 7

COMMUNICATION METHOD AND APPARATUS

CROSS-REFERENCE TO RELATED APPLICATIONS

This application is a continuation of International Application No. PCT/CN2020/096203, filed on Jun. 15, 2020, which claims priority to Chinese Patent Application No. 201910523810.8, filed on Jun. 17, 2019. The disclosures of the aforementioned applications are hereby incorporated by reference in their entireties.

TECHNICAL FIELD

This application relates to the field of communication technologies, and in particular, to a communication method and apparatus.

BACKGROUND

A vehicle-to-everything (V2X) technology is a key technology in a future intelligent transportation system. Communication between vehicles and communication between a vehicle and a base station can be performed by using the V2X technology. In this way, the vehicle can obtain all traffic information such as real-time road conditions, road information, and pedestrian information. This effectively improves driving safety of vehicles, reduces congestion, improves traffic efficiency, provides in-vehicle entertainment information, and the like.

In addition to transmitting data in broadcast mode that is based on a PC5 interface, a V2X network may further transmit data in groupcast mode. Currently, in groupcast mode, a transmit end sends groupcast information to members in a group, and each member located around the transmit end sends an acknowledgement (ACK) message to the transmit end after receiving the groupcast information sent by the transmit end, to indicate that the groupcast information is successfully received. Further, the transmit end determines, based on the received ACK message, whether all members located around the transmit end successfully receive the groupcast information. If the transmit end determines that at least one of the surrounding members unsuccessfully receives the groupcast information, the transmit end may resend the groupcast information, to implement a hybrid automatic repeat request (HARQ) mechanism for groupcast.

Currently, when the HARQ mechanism for groupcast is executed by an access stratum (AS) of a terminal, the AS of the terminal cannot determine whether all members located around the terminal successfully receive the groupcast information. In this case, the AS of the terminal cannot normally execute the HARQ mechanism for groupcast.

SUMMARY

This application provides a communication method and apparatus, so that an AS of a terminal can determine a specific quantity of members located around the terminal in a group, and can normally execute a HARQ mechanism for groupcast.

According to a first aspect, a communication method is provided. The method includes V2X layer of a first terminal sends a first message, where the first message includes an identifier of a group, and the first terminal corresponds to a first member in the group, the V2X layer of the first terminal receives a response message of the first message, the V2X layer of the first terminal determines a quantity of one or more reachable members in the group based on the response message, and the V2X layer of the first terminal sends the quantity of the one or more reachable members to an AS of the first terminal.

Based on the foregoing technical solution, the V2X layer of the first terminal sends the first message, to trigger terminals corresponding to other members in the group to feed back response messages, so that the V2X layer of the first terminal can discover, based on the response messages, members around the first member in the group, to determine the quantity of the one or more reachable members. The V2X layer of the first terminal sends the quantity of the one or more reachable members to the AS of the first terminal, so that the AS of the first terminal can learn of, by perception, the specific quantity of the members around the first terminal. In this way, the AS of the first terminal can determine, depending on whether a quantity of received ACK messages is equal to the perceived specific quantity of the members around the first terminal, whether all members around the first terminal successfully receive groupcast information. In this way, it is ensured that the AS of the first terminal normally executes a HARQ mechanism for groupcast.

In a possible design, the method further includes the V2X layer of the first terminal obtains a sequence number of the first member, and sends the sequence number of the first member to the AS of the first terminal. The sequence number of the first member is used to determine a feedback resource corresponding to the first member.

In a possible design, the first member is one of the one or more reachable members in the group. That the V2X layer of the first terminal obtains a sequence number of the first member includes the V2X layer of the first terminal determines the sequence number of the first member based on value(s) of application layer identifier(s) of the one or more reachable members, the V2X layer of the first terminal determines the sequence number of the first member based on value(s) of layer 2 identifier(s) of the one or more reachable members, or the V2X layer of the first terminal allocates the sequence number of the first member.

In a possible design, the sequence number of the first member is a layer 2 identifier of the first member or a layer 1 identifier of the first member.

In a possible design, the method includes the AS of the first terminal receives a groupcast message, the AS of the first terminal determines the feedback resource based on the sequence number of the first member, and the AS of the first terminal sends an ACK/negative acknowledgement (NACK) message of the groupcast message based on the feedback resource. Based on this design, the AS of the first terminal determines the corresponding feedback resource based on the sequence number of the first member, to ensure that the AS of the first terminal can normally feed back the ACK/NACK message to a groupcast transmit end. In addition, the groupcast transmit end does not need to configure a corresponding feedback resource for each member in the one or more reachable members. This reduces signaling overheads and reduces implementation complexity of a groupcast procedure.

In a possible design, the response message of the first message includes the identifier of the group and an identifier of a second member in the group, and the second member is one of the one or more reachable members in the group.

In a possible design, the method further includes the V2X layer of the first terminal sends a second message to a second terminal corresponding to the second member, where the second message carries at least one of the quantity of the one or more reachable members or identifier(s) of the one or more reachable members.

In a possible design, the second message includes any one of the following, including sequence number(s) of the one or more reachable members, a sequence number of the second member, or sequence number(s) of all other member(s) than the first member in the one or more reachable members.

In a possible design, the second message further includes the identifier of the group.

According to a second aspect, a communication method is provided. The method includes a V2X layer of a second terminal receives a first message from a first terminal, where the first message includes an identifier of a group, the first terminal corresponds to a first member in the group, and the second terminal corresponds to a second member in the group, the V2X layer of the second terminal sends a response message of the first message to the first terminal, the V2X layer of the second terminal receives a second message from the first terminal, the V2X layer of the second terminal obtains a quantity of one or more reachable members in the group based on the second message, and the V2X layer of the second terminal sends the quantity of the one or more reachable members to an AS of the second terminal.

Based on the foregoing technical solution, the V2X layer of the second terminal receives the first message from the first terminal, and sends the response message of the first message to the first terminal, so that the first terminal can find that the second member corresponding to the second terminal is a peripheral member of the first member corresponding to the first terminal. The V2X layer of the second terminal receives the second message from the first terminal, to obtain the quantity of the one or more reachable members. The V2X layer of the second terminal sends the quantity of the one or more reachable members to the AS of the second terminal, so that the AS of the second terminal can learn of, by perception, the specific quantity of members around the second terminal. In this way, the AS of the second terminal can determine, depending on whether a quantity of received ACK messages is equal to the perceived specific quantity of the members around the second terminal, whether all members around the second terminal successfully receive groupcast information. In this way, it is ensured that the AS of the second terminal normally executes a HARQ mechanism for groupcast.

In a possible design, the response message includes the identifier of the group and an identifier of the second member.

In a possible design, the second message carries at least one of the quantity of the one or more reachable members or identifier(s) of the one or more reachable members.

In a possible design, the second message includes any one of the following, including sequence number(s) of the one or more reachable members, a sequence number of the second member, or sequence number(s) of all other member(s) than the first member in the one or more reachable members.

In a possible design, when the second message includes the sequence number of the second member, the method further includes the V2X layer of the second terminal obtains the sequence number of the second member based on the second message, and the V2X layer of the second terminal sends the sequence number of the second member to the AS of the second terminal.

In a possible design, the method further includes the AS of the second terminal receives a groupcast message, the AS of the second terminal determines a feedback resource based on the sequence number of the second member, and the AS of the second terminal sends an ACK/NACK message of the groupcast message based on the feedback resource. Based on this design, the AS of the second terminal determines the corresponding feedback resource based on the sequence number of the second member, to ensure that the AS of the second terminal can normally feed back the ACK/NACK message to a groupcast transmit end. In addition, the groupcast transmit end does not need to configure a corresponding feedback resource for each member in the one or more reachable members. This reduces signaling overheads and reduces implementation complexity of a groupcast procedure.

In a possible design, the second message includes the identifier of the group.

According to a third aspect, a communication method is provided. The method includes an application layer of a terminal sends application layer identifier(s) of one or more reachable members in a group to a V2X layer of the terminal, where the terminal corresponds to a third member in the group, the V2X layer of the terminal determines a quantity of the one or more reachable members based on the application layer identifier(s) of the one or more reachable members, and the V2X layer of the terminal sends the quantity of the one or more reachable members to an AS of the terminal.

Based on the foregoing technical solution, the AS of the terminal can learn of the quantity of the one or more reachable members, to learn of, by perception, the specific quantity of members around the terminal. In this way, the AS of the terminal can determine, depending on whether a quantity of received ACK messages is equal to the perceived specific quantity of the members around the terminal, whether all members around the terminal successfully receive groupcast information. In this way, it is ensured that the AS of the terminal normally executes a HARQ mechanism for groupcast.

In a possible design, that the V2X layer of the terminal determines a quantity of the one or more reachable members based on the application layer identifier(s) of the one or more reachable members includes the V2X layer of the terminal generates/allocates layer 2 identifier(s) of the one or more reachable members based on the application layer identifier(s) of the one or more reachable members, and the V2X layer of the terminal determines the quantity of the one or more reachable members based on the layer 2 identifier(s) of the one or more reachable members.

In a possible design, the method further includes the V2X layer of the terminal obtains a sequence number of the third member, and the V2X layer of the terminal sends the sequence number of the third member to the AS of the terminal. The sequence number of the third member is used to determine a feedback resource of the third member.

In a possible design, the third member is one of the one or more reachable members in the group, and that the V2X layer of the terminal obtains a sequence number of the third member includes the V2X layer of the terminal determines the sequence number of the third member based on value(s) of the application layer identifier(s) of the one or more reachable members, the V2X layer of the terminal determines the sequence number of the third member based on value(s) of the layer 2 identifier(s) of the one or more reachable members, the V2X layer of the terminal determines the sequence number of the third member based on a position of the third member in a first list, where the first list is used to record the application layer identifier(s) or the layer 2 identifier(s) of the one or more reachable members, the V2X layer of the terminal determines the sequence number of the third member based on a second list, where the second list is used to record the layer 2 identifier(s) of the one or more reachable members, or the V2X layer of the terminal allocates the sequence number of the third member.

In a possible design, the sequence number of the third member is a layer 2 identifier of the third member or a layer 1 identifier of the third member.

In a possible design, the method further includes the AS of the terminal receives a groupcast message, the AS of the terminal determines the feedback resource based on the sequence number of the third member, and the AS of the terminal sends an ACK/NACK message of the groupcast message based on the feedback resource. Based on this design, the AS of the terminal determines the corresponding feedback resource based on the sequence number of the third member, to ensure that the AS of the terminal can normally feed back the ACK/NACK message to a groupcast transmit end. In addition, the groupcast transmit end does not need to configure a corresponding feedback resource for each member in the one or more reachable members. This reduces signaling overheads and reduces implementation complexity of a groupcast procedure.

In a possible design, the method further includes the application layer of the terminal sends an application layer identifier of the group to the V2X layer of the terminal, and the V2X layer of the terminal sends a layer 2 identifier of the group to the AS of the terminal based on the application layer identifier of the group.

According to a fourth aspect, a communication method is provided. The method includes an application layer of a terminal sends application layer identifier(s) of one or more reachable members in a group to a V2X layer of the terminal, where the terminal corresponds to a third member in the group, the V2X layer of the terminal sends layer 2 identifier(s) of the one or more reachable members to an AS of the terminal based on the application layer identifier(s) of the one or more reachable members, the AS of the terminal determines a quantity of the one or more reachable members based on the layer 2 identifier(s) of the one or more reachable members.

Based on the foregoing technical solution, the AS of the terminal can learn of the quantity of the one or more reachable members, to learn of, by perception, the specific quantity of members around the terminal. In this way, the AS of the terminal can determine, depending on whether a quantity of received ACK messages is equal to the perceived specific quantity of the members around the terminal, whether all members around the terminal successfully receive groupcast information. In this way, it is ensured that the AS of the terminal normally executes a HARQ mechanism for groupcast.

In a possible design, the method further includes the AS of the terminal obtains a sequence number of the third member. The sequence number of the third member is used to determine a feedback resource of the third member.

In a possible design, the third member is one of the one or more reachable members in the group, and that the AS of the terminal obtains a sequence number of the third member includes the AS of the terminal determines the sequence number of the third member based on value(s) of the layer 2 identifier(s) of the one or more reachable members, the AS of the terminal determines the sequence number of the third member based on a position of the third member in a second list, where the second list is used to record the layer 2 identifier(s) of the one or more reachable members, the AS of the terminal allocates the sequence number of the third member.

In a possible design, the sequence number of the third member is a layer 2 identifier of the third member or a layer 1 identifier of the third member.

In a possible design, the method further includes the AS of the terminal receives a groupcast message, the AS of the terminal determines the feedback resource based on the sequence number of the third member, and the AS of the terminal sends an ACK/NACK message of the groupcast message based on the feedback resource. Based on this design, the AS of the terminal determines the corresponding feedback resource based on the sequence number of the third member, to ensure that the AS of the terminal can normally feed back the ACK/NACK message to a groupcast transmit end. In addition, the groupcast transmit end does not need to configure a corresponding feedback resource for each member in the one or more reachable members. This reduces signaling overheads and reduces implementation complexity of a groupcast procedure.

In a possible design, the method further includes the application layer of the terminal sends an application layer identifier of the group to the V2X layer of the terminal, and the V2X layer of the terminal sends a layer 2 identifier of the group to the AS of the terminal based on the application layer identifier of the group.

According to a fifth aspect, a communication method is provided. The method includes an application layer of the terminal obtains a quantity of one or more reachable members in a group, where a third member is a reachable member in the group, the application layer of the terminal sends the quantity of the one or more reachable members to a V2X layer of the terminal, and the V2X layer of the terminal sends the quantity of the one or more reachable members to an AS of the terminal.

Based on the foregoing technical solution, the AS of the terminal can learn of the quantity of the one or more reachable members, to learn of, by perception, the specific quantity of members around the terminal. In this way, the AS of the terminal can determine, depending on whether a quantity of received ACK messages is equal to the perceived specific quantity of the members around the terminal, whether all members around the terminal successfully receive groupcast information. In this way, it is ensured that the AS of the terminal normally executes a HARQ mechanism for groupcast.

In a possible design, that an application layer of the terminal obtains a quantity of one or more reachable members in a group includes the application layer of the terminal obtains application layer identifier(s) of the one or more reachable members, and determines the quantity of the one or more reachable members based on the application layer identifier(s) of the one or more reachable members, the application layer of the terminal receives the quantity of the one or more reachable members sent by an application server, or the application layer of the terminal receives the quantity of the one or more reachable members sent by a group management terminal.

In a possible design, that the application layer of the terminal obtains application layer identifier(s) of the one or more reachable members includes the application layer of the terminal receives the application layer identifier(s) of the one or more reachable members sent by an application server, or the application layer of the terminal receives the application layer identifier(s) of the one or more reachable members sent by a group management terminal.

In a possible design, the method further includes the application layer of the terminal obtains a sequence number of the third member, the application layer of the terminal sends the sequence number of the third member to the V2X layer of the terminal, and the V2X layer of the terminal sends the sequence number of the third member to the AS of the terminal. The sequence number of the third member is used to determine a feedback resource of the third member.

In a possible design, the third member is one of the one or more reachable members in the group, and that the application layer of the terminal obtains a sequence number of the third member includes the application layer of the terminal determines the sequence number of the third member based on value(s) of application layer identifier(s) of the one or more reachable members, the application layer of the terminal determines the sequence number of the third member based on a position of the third member in a third list, where the third list is used to record application layer identifier(s) of the one or more reachable members, the application layer of the terminal allocates the sequence number of the third member, the application layer of the terminal receives the sequence number of the third member sent by an application server, or the application layer of the terminal receives the sequence number of the third member sent by a group management terminal.

In a possible design, the method further includes the AS of the terminal receives a groupcast message, the AS of the terminal determines the feedback resource based on the sequence number of the third member, and the AS of the terminal sends an ACK/NACK message of the groupcast message based on the feedback resource. Based on this design, the AS of the terminal determines the corresponding feedback resource based on the sequence number of the third member, to ensure that the AS of the terminal can normally feed back the ACK/NACK message to a groupcast transmit end. In addition, the groupcast transmit end does not need to configure a corresponding feedback resource for each member in the one or more reachable members. This reduces signaling overheads and reduces implementation complexity of a groupcast procedure.

In a possible design, the method further includes the application layer of the terminal sends an application layer identifier of the group to the V2X layer of the terminal, and the V2X layer of the terminal sends a layer 2 identifier of the group to the AS of the terminal based on the application layer identifier of the group.

According to a sixth aspect, a communication apparatus is provided. The apparatus includes a V2X layer module and an AS module. The V2X layer module is configured to send a first message, where the first message includes an identifier of a group, and the communication apparatus corresponds to a first member of the group, receive a response message of the first message, determine a quantity of one or more reachable members in the group based on the response message, and send the quantity of the one or more reachable members to the AS module. The AS module is configured to receive the quantity of the one or more reachable members sent by the V2X layer module.

In a possible design, the V2X layer module is further configured to obtain a sequence number of the first member, and send the sequence number of the first member to the AS module.

In a possible design, the first member is one of the one or more reachable members in the group. That the V2X layer module is further configured to obtain a sequence number of the first member includes determining the sequence number of the first member based on value(s) of application layer identifier(s) of the one or more reachable members, determining the sequence number of the first member based on value(s) of layer 2 identifier(s) of the one or more reachable members, or allocating the sequence number of the first member.

In a possible design, the sequence number of the first member is a layer 2 identifier of the first member or a layer 1 identifier of the first member.

In a possible design, the AS module is further configured to receive a groupcast message, determine a feedback resource based on the sequence number of the first member, and send an ACK/NACK message of the groupcast message based on the feedback resource.

In a possible design, the response message includes the identifier of the group and an identifier of a second member in the group, and the second member is one of the one or more reachable members in the group.

In a possible design, the V2X layer module is further configured to send a second message to a second terminal corresponding to the second member, where the second message carries at least one of the quantity of the one or more reachable members or identifier(s) of the one or more reachable members.

In a possible design, the second message includes any one of the following, including sequence number(s) of the one or more reachable members, a sequence number of the second member, or sequence number(s) of all other member(s) than the first member in the one or more reachable members.

In a possible design, the second message further includes the identifier of the group.

According to a seventh aspect, a communication apparatus is provided. The apparatus includes a V2X layer module and an AS module. The V2X layer module is configured to receive a first message from a first terminal, where the first message includes an identifier of a group, the first terminal corresponds to a first member in the group, and the communication apparatus corresponds to a second member in the group, send a response message of the first message to the first terminal, receive a second message sent by a V2X layer of the first terminal, obtain a quantity of one or more reachable members in the group based on the second message, and send the quantity of the one or more reachable members to the AS module. The AS module is configured to receive the quantity of the one or more reachable members sent by the V2X layer module.

In a possible design, the response message includes the identifier of the group and an identifier of the second member.

In a possible design, the second message carries at least one of the quantity of the one or more reachable members or identifier(s) of the one or more reachable members.

In a possible design, the second message includes any one of the following, including sequence number(s) of the one or more reachable members, a sequence number of the second member, or sequence number(s) of all other member(s) than the first member in the one or more reachable members.

In a possible design, the V2X layer module is further configured to obtain the sequence number of the second member based on the second message, and send the sequence number of the second member to the AS module. The AS module is further configured to receive the sequence number of the second member sent by the V2X layer module.

In a possible design, the AS module is further configured to receive a groupcast message, determine a feedback resource based on the sequence number of the second member, and send an ACK/NACK message of the groupcast message based on the feedback resource.

In a possible design, the second message includes the identifier of the group.

According to an eighth aspect, a communication apparatus is provided. The apparatus includes an application layer module, a V2X layer module, and an AS module. The application layer module is configured to send application layer identifier(s) of one or more reachable members in a group to the V2X layer module, where the communication apparatus corresponds to a third member in the group. The V2X layer module is configured to receive the application layer identifier(s) of the one or more reachable members sent by the application layer module, determine a quantity of the one or more reachable members based on the application layer identifier(s) of the one or more reachable members, and send the quantity of the one or more reachable members in the group to the AS module. The AS module is configured to receive the quantity of the one or more reachable members sent by the V2X layer module.

In a possible design, that the V2X layer module is configured to determine a quantity of the one or more reachable members based on the application layer identifier (s) of the one or more reachable members includes generating/allocating layer 2 identifier(s) of the one or more reachable members based on the application layer identifier (s) of the one or more reachable members, and determining the quantity of the one or more reachable members based on the layer 2 identifier(s) of the one or more reachable members.

In a possible design, the V2X layer module is further configured to obtain a sequence number of the third member, and send the sequence number of the third member to the AS module. The AS module is further configured to receive the sequence number of the third member sent by the V2X layer module.

In a possible design, that the V2X layer module is further configured to obtain a sequence number of the third member includes determining the sequence number of the third member based on value(s) of the application layer identifier (s) of the one or more reachable members, determining the sequence number of the third member based on value(s) of the layer 2 identifier(s) of the one or more reachable members, determining the sequence number of the third member based on a position of the third member in a first list, where the first list is used to record the application layer identifier (s) or the layer 2 identifier(s) of the one or more reachable members, or allocating the sequence number of the third member.

In a possible design, the sequence number of the third member is a layer 2 identifier of the third member or a layer 1 identifier of the third member.

In a possible design, the AS module is further configured to receive a groupcast message, determine a feedback resource based on the sequence number of the third member, and send an ACK/NACK message of the groupcast message based on the feedback resource.

In a possible design, the application layer module is further configured to send an application layer identifier of the group to the V2X layer module. The V2X layer module is further configured to receive the application layer identifier of the group sent by the application layer module, and send a layer 2 identifier of the group to the AS module based on the application layer identifier of the group. The AS module is further configured to receive the layer 2 identifier of the group sent by the V2X layer module.

According to a ninth aspect, a communication apparatus is provided. The apparatus includes an application layer module, a V2X layer module, and an AS module. The application layer module is configured to send application layer identifier(s) of one or more reachable members in a group to the V2X layer module, where the communication apparatus corresponds to a third member in the group. The V2X layer module is configured to receive the application layer identifier(s) of the one or more reachable members sent by the application layer module, and send layer 2 identifier (s) of the one or more reachable members to the AS module based on the application layer identifier(s) of the one or more reachable members. The AS module is configured to receive the layer 2 identifier(s) of the one or more reachable members sent by the V2X layer module, and determine a quantity of the one or more reachable members based on the layer 2 identifier(s) of the one or more reachable members.

In a possible design, the AS module is further configured to obtain a sequence number of the third member.

In a possible design, that the AS module is further configured to obtain a sequence number of the third member includes determining the sequence number of the third member based on value(s) of the layer 2 identifier(s) of the one or more reachable members, determining the sequence number of the third member based on a position of the third member in a second list, where the second list is used to record the layer 2 identifier(s) of the one or more reachable members, or allocating the sequence number of the third member.

In a possible design, the sequence number of the third member is a layer 2 identifier of the third member or a layer 1 identifier of the third member.

In a possible design, the AS module is further configured to receive a groupcast message, determine a feedback resource based on the sequence number of the third member, and send an ACK/NACK message of the groupcast message based on the feedback resource.

In a possible design, the application layer module is further configured to send an application layer identifier of the group to the V2X layer module. The V2X layer module is further configured to receive the application layer identifier of the group sent by the application layer module, and send a layer 2 identifier of the group to the AS module based on the application layer identifier of the group. The AS module is further configured to receive the layer 2 identifier of the group sent by the V2X layer module.

According to a tenth aspect, a communication apparatus is provided. The apparatus includes an application layer module, a V2X layer module, and an AS module. The application layer module is configured to obtain a quantity of one or more reachable members in a group, where the communication apparatus corresponds to a third member in the group, and send the quantity of the one or more reachable members to the V2X layer module. The V2X layer module is configured to send the quantity of the one or more reachable members to the AS module. The AS module is configured to receive the quantity of the one or more reachable members sent by the V2X layer module.

In a possible design, that the application layer module is configured to obtain a quantity of one or more reachable members in a group includes obtaining application layer identifier(s) of the one or more reachable members, and determining the quantity of the one or more reachable members based on the application layer identifier(s) of the one or more reachable members, or receiving the quantity of the one or more reachable members from an application server/a group management terminal.

In a possible design, that the application layer module is configured to obtain application layer identifier(s) of the one or more reachable members includes receiving the application layer identifier(s) of the one or more reachable members from the application server/the group management terminal.

In a possible design, the application layer module is further configured to obtain a sequence number of the third member, and send the sequence number of the third member to the V2X layer module. The V2X layer module is further configured to send the sequence number of the third member to the AS module. The AS module is further configured to receive the sequence number of the third member sent by the V2X layer module.

In a possible design, that the application layer module is further configured to obtain a sequence number of the third member includes determining the sequence number of the third member based on value(s) of application layer identifier(s) of the one or more reachable members, determining the sequence number of the third member based on a position of the third member in a third list, where the third list is used to record application layer identifier(s) of the one or more reachable members, allocating the sequence number of the third member, or receiving the sequence number of the third member from an application server or a group management terminal.

In a possible design, the AS module is further configured to receive a groupcast message, determine a feedback resource based on the sequence number of the third member, and send an ACK/NACK message of the groupcast message based on the feedback resource.

In a possible design, the application layer module is further configured to send an application layer identifier of the group to the V2X layer module. The V2X layer module is further configured to receive the application layer identifier of the group sent by the application layer module, and send a layer 2 identifier of the group to the AS module based on the application layer identifier of the group. The AS module is further configured to receive the layer 2 identifier of the group sent by the V2X layer module.

According to an eleventh aspect, a communication apparatus is provided. The apparatus includes a processor and a memory, where the memory and the processor are coupled. When executing instructions stored in the memory, the processor can implement the communication method according to any one of the first aspect to the fifth aspect. Optionally, the apparatus may further include a communication interface. The communication interface is used by the communication apparatus to communicate with another device. For example, the communication interface may be a transceiver, a circuit, a bus, a module, or a communication interface of another type.

According to a twelfth aspect, a computer-readable storage medium is provided. The computer-readable storage medium stores instructions, and when the instructions are run on a computer, the computer is enabled to perform the communication method according to any one of the first aspect to the fifth aspect.

According to a thirteenth aspect, a computer program product is provided. The computer program product includes instructions, and when the instructions are run on a computer, the computer is enabled to perform the communication method according to any one of the first aspect to the fifth aspect.

According to a fourteenth aspect, a chip is provided. The chip includes a processor, and when the processor executes instructions, the processor is configured to perform the communication method according to any one of the first aspect to the fifth aspect. The instructions may be from a memory inside the chip, or may be from a memory outside the chip. Optionally, the chip further includes an input/output circuit.

According to a fifteenth aspect, a communication system is provided, and includes a first terminal and a second terminal. The first terminal is configured to perform the communication method in any design of the first aspect. The second terminal is configured to perform the communication method in any design of the second aspect.

For technical effects of any design of the sixth aspect to the fifteenth aspect, refer to beneficial effects in the corresponding method provided above. Details are not described herein again.

BRIEF DESCRIPTION OF THE DRAWINGS

FIG. 4A and FIG. 4B are a flowchart of a communication method according to an embodiment of this application;

FIG. 5A to FIG. 5C are a flowchart of another communication method according to an embodiment of this application;

FIG. 7 is a schematic diagram of another second message according to an embodiment of this application;

DETAILED DESCRIPTION OF ILLUSTRATIVE EMBODIMENTS

Figure 1:
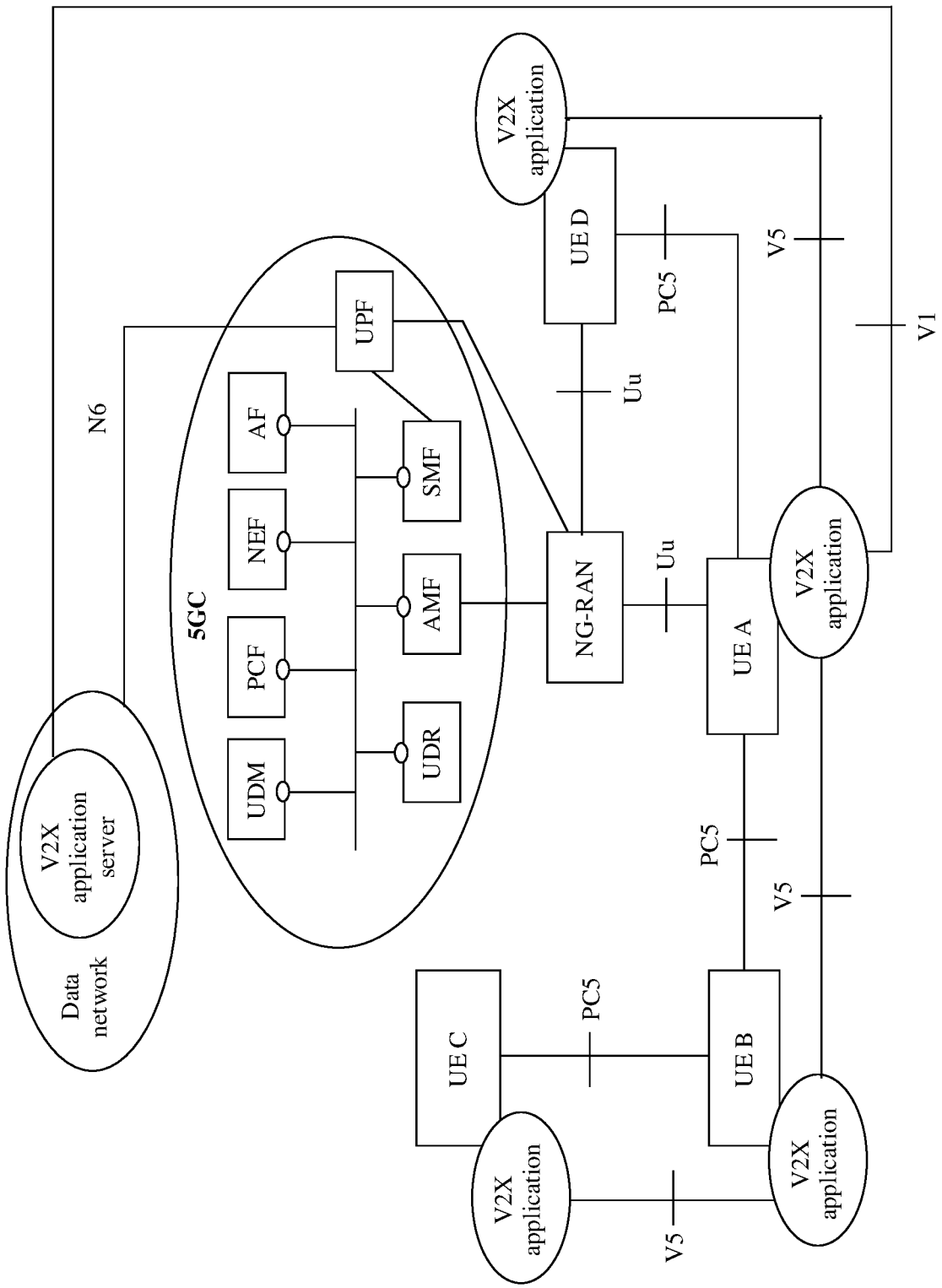
FIG. 1 is a schematic diagram of an architecture of a communication system according to an embodiment of this application.

In descriptions of this application, unless otherwise specified, "/" means "or". For example, A/B may represent A or B. For example, A/B may represent A or B. The term "and/or" in this specification describes only an association relationship between associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and words such as "first" and "second" are not necessarily different.

It should be noted that, in this application, the word "for example" or "example" is used to represent giving an example, an illustration, or a description. Any embodiment or design scheme described with "for example" or as an "example" in this application should not be explained as being more preferred or having more advantages than another embodiment or design scheme. Exactly, use of the word "example" or "for example" or the like is intended to present a relative concept in a specific manner.

The following briefly describes the technical terms in the embodiments of this application.

1. HARQ

HARQ is a combination of two technologies: forward error correction (FEC) and automatic repeat request (ARQ). When a HARQ mechanism is used, a receive end uses, in a packet receiving process, the FEC technology to correct an error packet that can be corrected. In addition, the receive end determines, through error detection, a packet that cannot be corrected, discards the packet that cannot be corrected, and requests a transmit end to resend the same packet.

In the embodiments of this application, a HARQ mechanism in groupcast mode mainly means in a group, when a transmit-end member sends a groupcast message, after other members around the transmit-end member successfully receive the groupcast message, the other members each send a response message (for example, an ACK message or a NACK message) to the transmit-end member. Then the transmit-end member determines, based on the received response message, whether all surrounding members successfully receive the groupcast message. If the transmit-end member determines that at least one of the surrounding members unsuccessfully receives the groupcast message, the transmit-end member resends the groupcast message.

2. Group and Reachable Member

A group may be a group in a V2X application, or may be a group configured by a group management server at an application layer of the terminal. One group may include a plurality of members.

For a group, reachable members may include some or all members in the group. For example, a group includes a member #1, a member #2, a member #3, and a member #4, and all reachable members include the member #1 and the member #2, or all reachable members include the member #1, the member #2, the member #3, and the member #4.

For a member in a group, reachable members include another member in the group that can receive a groupcast message sent by the member. Optionally, the reachable members further include the member. For example, a group #1 includes members #1 to #10. It is assumed that the members #2 to #5 are within coverage of the member #1, and the members #6 to #10 are outside the coverage of the member #1. That is, when the member #1 sends a groupcast message, the members #2 to #5 can receive the groupcast message of the member #1, and the members #6 to #10 cannot receive the groupcast message sent by the member #1. Therefore, for the member #1, reachable members include the members #2 to #5. Optionally, the reachable members further include the member #1.

Alternatively, for a member in a group, reachable members include other members in the group that are located around the member. Optionally, the reachable members further include the member. It may be understood that, the other members in the group that are located around the member are members located in a same geographic area (for example, on a street or in a city) as the member. Alternatively, the other members in the group that are located around the member are other members located in a same communication area (for example, a cell or a tracking area) as the member. For example, a group #1 includes members #1 to #10, the members #1 to #4 are located in a cell #1, and the members #5 #10 are located in a cell #2. In this case, for the member #1, reachable members include the member #2 and the member #3, and may further include the member #1. For the member #5, reachable members include the member #6 to the member #10, and may further include the member #5.

3. Member Corresponding to a Terminal and Terminal Corresponding to a Member

For a group, a terminal corresponds to one member in the group, which specifically means that the user of the terminal is a member in the group. For example, if a terminal corresponds to a member #1 in a group, it indicates that the user of the terminal is the member #1 in the group.

For a group, a terminal corresponding to a member in the group is specifically a terminal used by a user serving as the member. For example, a user #1 is a member #1 in a group, and a terminal corresponding to the member #1 is a terminal used by the user #1.

Optionally, the user of a terminal may be a user of a V2X application on the terminal.

A method provided in the embodiments of this application may be applied to any communication system supporting V2X service data transmission. The communication system may be a 3rd generation partnership project (3GPP) communication system, for example, a long term evolution (LTE) system, may be a 5th generation (5G) mobile communication system or a new radio (NR) system, or may be a non-3GPP communication system. This is not limited.

FIG. 1 is a diagram of an architecture of a communication system. The communication system may include a terminal, an access network device, a core network device, a data network (DN), and the like.

The terminal may be referred to as user equipment (UE) or a terminal device. A V2X application may be installed on the terminal. The terminal may support V2X communication, which is, for example, receiving or sending a V2X message. In this case, the terminal may also be referred to as a V2X terminal. The V2X message may include but is not limited to a vehicle to vehicle (V2V) message, a vehicle to pedestrian (V2P) message, a vehicle to network (V2N) message, vehicle to infrastructure (V2I) information, an anti-collision message exchanged between vehicles, an entertainment application message, a navigation message exchanged between vehicles, and the like. It is clear that the terminal shown in FIG. 1 may include but is not limited to a vehicle-mounted terminal, a mobile phone, a tablet computer or a computer having a wireless transceiver function, a smart gas station, an intelligent traffic light, and the like.

In the embodiments of this application, the terminal may transmit V2X messages through communication interfaces of different types. The communication interface may include a PC5 interface and/or a Uu interface. The Uu interface is a wireless connection interface between the terminal and the access network device. The PC5 interface is a reference point for user plane ProSe direct communication between terminals for a V2X service.

The access network device is responsible for radio resource management, uplink and downlink data classification, and QoS application, functions of completing signaling processing with a control plane network element and completing data forwarding with a user plane network element, and the like. For example, the access network device may be a base station, a broadband network gateway (BNG), an aggregation switch, a non-3GPP access device, or the like. The base station may include base stations in various forms, for example, a macro base station, a micro base station (also referred to as a small cell), a relay station, or an access point. This is not specifically limited in the embodiments of this application. Any device through which the terminal accesses a core network is referred to as the access network device in this specification, and details are not described herein. For example, the access network device may be an evolved universal terrestrial radio access network (E-UTRAN) device in a 4G network, a next generation radio access network (NG-RAN) device in a 5G network, or the like.

Refer to FIG. 1. The core network device may include an access and mobility management function (AMF), a policy control function (PCF), a unified data management (UDM), a session management function (SMF), a user plane function (UPF), an application function (AF), a network exposure function (NEF), and a user data repository (UDR).

For functions of network elements such as the AMF, the PCF, and the UDM, refer to the conventional technology. Details are not described herein.

It should be noted that a network consisting of operator network elements except the RAN may become a core network. In the 4G network, the core network includes network elements such as an MME, an S-GW, a P-GW, and an HSS. In the 5G network, the core network includes network elements such as the AMF, the SMF, the UPF, the UDM, and the PCF.

Figure 2:
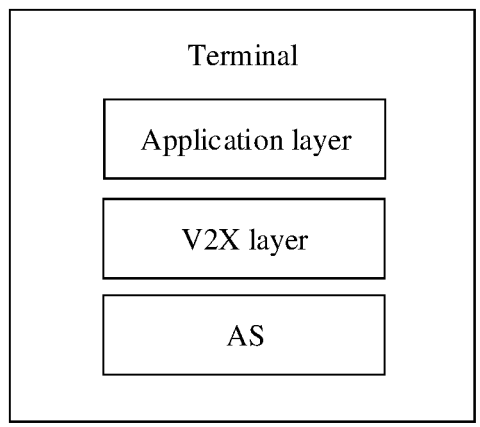
FIG. 2 is a schematic diagram of protocol layers of a terminal according to an embodiment of this application.

FIG. 2 is a schematic diagram of protocol layers of a terminal. The protocol layers of the terminal may support the terminal in transmitting a V2X message. The protocol layers of the terminal may include an application layer, a V2X layer, and an AS.

The application layer is mainly used to provide a V2X service, for example, generate a V2X message.

The V2X layer is mainly used to determine a communication interface of the V2X message, determine a communication mode of the V2X message on a PC5 interface, establish a PC5 unicast connection, and determine a layer 2 identifier in PC5 communication. The V2X layer of the terminal may be independently deployed in the terminal, or may be deployed at another protocol layer of the terminal. For example, the V2X layer may be deployed at a non-access stratum (NAS) (not shown in FIG. 2) of the terminal. When the V2X layer is deployed at the NAS, an action performed by the V2X layer may be considered as being performed by the NAS. This is not limited. In the embodiments of this application, an example in which the V2X layer of the terminal is independently deployed in the terminal is used for description. This is not limited.

The AS is mainly used to support procedures such as public land mobile network (PLMN) selection, cell selection, and radio resource management. For example, the radio resource management procedure includes a radio resource control (RRC) connection establishment procedure, a signaling establishment procedure between the terminal and the core network, a handover procedure, and the like. For PC5 communication, the AS further applies for PC5 communication resources for the V2X message sent through the PC5 interface, fills in source and destination layer 2 addresses for the V2X message, and establishes a PC5-RRC connection for PC5 unicast communication.

Figure 3:
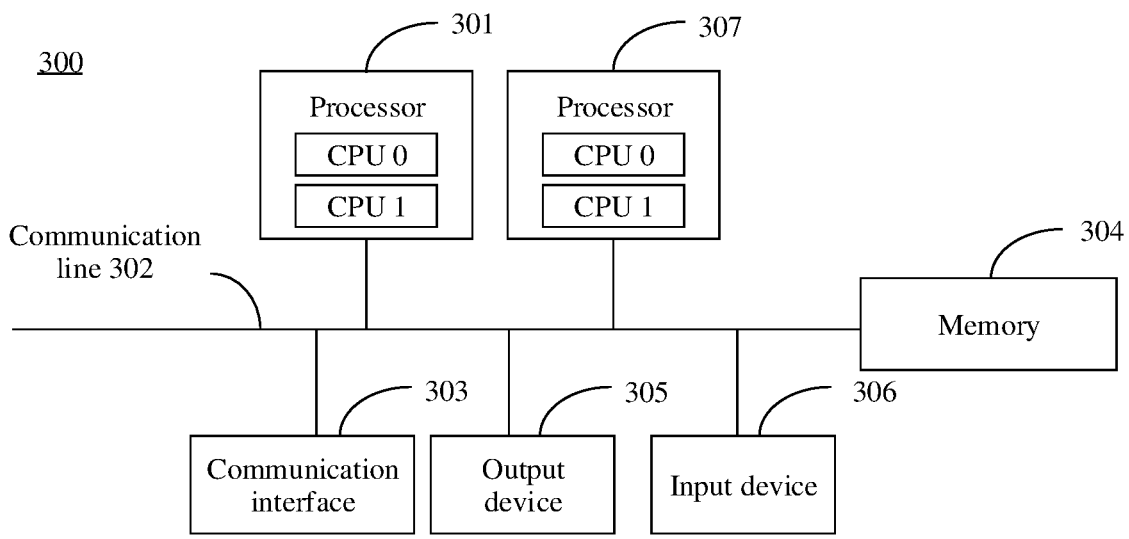
FIG. 3 is a schematic diagram of a structure of a communication apparatus according to an embodiment of this application.

FIG. 3 is a schematic diagram of composition of a communication apparatus 300 according to an embodiment of this application. The communication apparatus 300 may be a terminal, a chip or a system-on-a-chip in the terminal. The communication apparatus 300 includes a processor 301, a communication line 302, and a communication interface 303.

Further, the communication apparatus 300 may include a memory 304. The processor 301, the memory 304, and the communication interface 303 may be connected to each other through the communication line 302.

The processor 301 may be a central processing unit (CPU), a general-purpose processor, a network processor (NP), a digital signal processor (DSP), a microprocessor, a microcontroller, a programmable logic device (PLD), or any combination thereof. The processor 301 may alternatively be any other apparatus having a processing function, for example, a circuit, a device, or a software module. This is not limited.

The communication line 302 is configured to transmit information between components included in the communication apparatus 300.

The communication interface 303 is configured to communicate with another device or another communication network. The another communication network may be the Ethernet, a radio access network (RAN), a wireless local area network (WLAN), or the like. The communication interface 303 may be a module, a circuit, a transceiver, or any apparatus that can implement communication.

The memory 304 is configured to store instructions. The instructions may be a computer program.

The memory 304 may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or another compact disc storage, optical disc storage (including a compressed optical disc, a laser disc, an optical disc, a digital universal optical disc, a Blu-ray optical disc, and the like), a magnetic disk storage medium or another magnetic storage device, or the like. This is not limited.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited.

The processor 301 is configured to execute the instructions stored in the memory 304, to implement the communication methods provided in the following embodiments of this application. For example, when the communication apparatus 300 is a terminal, or a chip or a system-on-a-chip in the terminal, the processor 301 may execute the instructions stored in the memory 304, to implement steps performed by a transmit end in the following embodiments of this application.

In an example, the processor 301 may include one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 may further include a processor 307.

In an optional implementation, the communication apparatus 300 further includes an output device 305 and an input device 306. For example, the input device 306 is a device such as a keyboard, a mouse, a microphone, or a joystick, and the output device 305 is a device such as a display or a speaker.

The following specifically describes the technical solutions provided in the embodiments of this application with reference to the accompanying drawings of the specification.

Figure 4A:
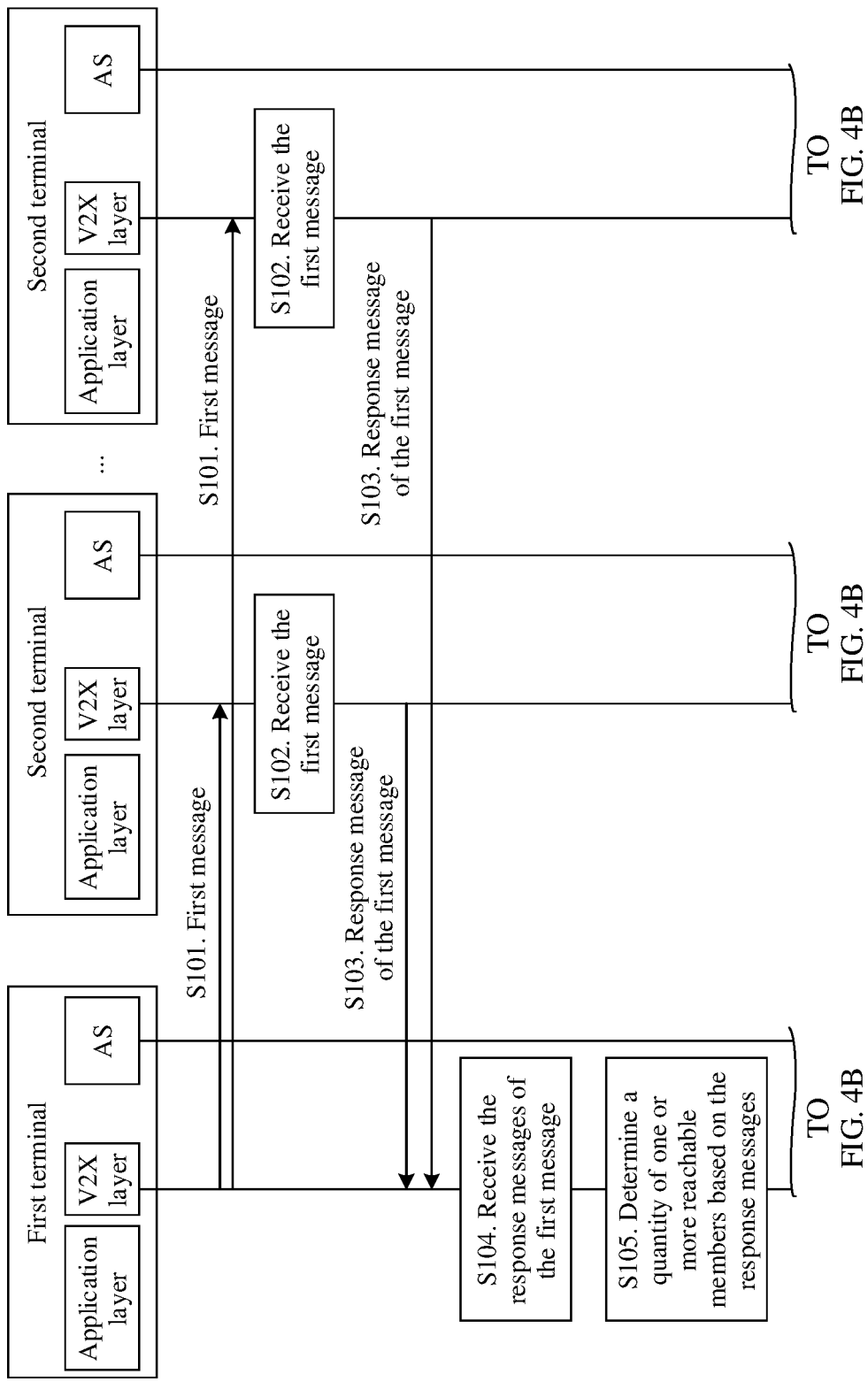

FIG. 4A and FIG. 4B show a communication method provided in an embodiment of this application. The method includes the following steps.

S101. A V2X layer of a first terminal sends a first message.

The first message may include an identifier of a group. The identifier of the group may include an application layer identifier and/or a layer 2 identifier of the group.

It may be understood that the identifier of the group included in the first message may be used to indicate a group corresponding to the first message.

The first message may be used to discover another reachable member in the group except a first member corresponding to the first terminal. In other words, the first message may be used to discover members located around the first member corresponding to the first terminal in the group. Optionally, the first message may also be referred to as a group member report (group member report). This is not limited in this embodiment of this application.

The first terminal may correspond to the first member in the group, and the first member may be one of one or more reachable members in the group.

Optionally, the first message further includes indication information and an identifier of the first member. The indication information may be used to indicate to feed back a response message of the first message. The identifier of the first member may include an application layer identifier and/or a layer identifier of the first member.

In an implementation, when a V2X application of the first terminal triggers a groupcast service, an application layer of the first terminal sends service triggering indication information to the V2X layer of the first terminal. Then, the V2X layer of the first terminal sends the first message in groupcast/broadcast mode.

In another implementation, when an application layer of the first terminal establishes/updates a V2X group, the application layer of the first terminal sends V2X group establishment/update indication information to the V2X layer of the first terminal. Then, the V2X layer of the first terminal sends the first message in groupcast/broadcast mode.

Both the service triggering indication information and the V2X group establishment/update indication information may include the application layer identifier of the group, and may further include the application layer identifier of the first member.

S102. A V2X layer of a second terminal receives the first message from the first terminal.

The second terminal may be a terminal corresponding to any member (which may be referred to as a second member) other than the first member in the group. For example, if a V2X layer of a terminal can receive the first message from the first terminal, and a user of the terminal is a member in the group corresponding to the first message, the terminal is the second terminal. For example, a user of a terminal #1 is a member in a group #1, a user of a terminal #2 is a member in a group #2, a user of a terminal #3 is a member in the group #1, and a user of a terminal #4 is a member in the group #1. It is assumed that the terminal #1 is the first terminal. A V2X layer of the terminal #1 sends a first message, where the first message includes an identifier of the group #1. A V2X layer of the terminal #2, a V2X layer of the terminal #3, and a V2X layer of the terminal #4 all receive the first message from the terminal #1. Because the user of the terminal #2 is not a member in the group #1, the second terminal does not include the terminal #2. The user of the terminal #3 and the user of the terminal #4 are members in the group #1. Therefore, the second terminal may be at least one of the terminal #3 and the terminal #4.

It may be understood that, because the V2X layer of the second terminal can receive the first message from the first terminal, the second terminal is located near the first terminal, that is, the second member corresponding to the second terminal is located around the first member corresponding to the first terminal. In this case, the second member corresponding to the second terminal is also one of the one or more reachable members in the group.

S103. The V2X layer of the second terminal sends a response message of the first message.

The response message may include an identifier of the group and an identifier of the second member. The identifier of the second member may include an application layer identifier and/or a layer 2 identifier of the second member. It should be noted that the identifier of the group included in the response message and the identifier of the group included in the first message may be a same group identifier.

The response message may have another name, for example, group member report acknowledgement (group member report ack). This is not limited in this embodiment of this application.

In an implementation, the V2X layer of the second terminal obtains an application layer identifier of the group from an application layer of the second terminal, and generates/allocates a layer 2 identifier of the group based on the application layer identifier of the group. Therefore, the V2X layer of the second terminal may store the identifier of the group. After the V2X layer of the second terminal receives the first message, the V2X layer of the second terminal determines whether the identifier of the group stored by the V2X layer of the second terminal matches the identifier of the group included in the first message. If the identifier of the group stored by the V2X layer of the second terminal is the same as the identifier of the group included in the first message, the V2X layer of the second terminal sends the response message of the first message.

That the V2X layer of the second terminal allocates the layer 2 identifier of the group based on the application layer identifier of the group specifically means that the V2X layer of the second terminal randomly allocates a layer 2 identifier of the group.

That the V2X layer of the second terminal generates the layer 2 identifier of the group based on the application layer identifier of the group specifically means that the V2X layer of the second terminal generates the layer 2 identifier of the group based on a preset algorithm/a first correspondence and the application layer identifier of the group. The first correspondence is a correspondence between an application layer identifier of the group and a layer 2 identifier of the group. For example, Table 1 is an example of the first correspondence. Descriptions are provided with reference to Table 1. Assuming that the application layer identifier of the group is 11, the V2X layer of the second terminal can determine that the layer 2 identifier of the group is 1111110000000000.

TABLE 1

| Application layer identifier of a group | Layer 2 identifier of the group |
| --- | --- |
| 11 | 1111110000000000 |
| 10 | 1111110000000001 |
| 00 | 1111110000000011 |
| 01 | 1111110000000010 |

S104. The V2X layer of the first terminal receives the response message of the first message.

It may be understood that the V2X layer of the first terminal may receive one or more response messages of the first message.

S105. The V2X layer of the first terminal determines a quantity of the one or more reachable members based on the response message.

In an implementation, the V2X layer of the first terminal determines the quantity of the one or more reachable members based on a quantity of received response messages.

If the second member is one of the one or more reachable members in the group, and the first member is one of the one or more reachable members in the group, the quantity of the one or more reachable members may be equal to the quantity of the received response messages plus 1.

With reference to the example in step S102, assuming that the terminal #1 receives only a response message of the terminal #3, a quantity of reachable members in the group #1 may be 2.

If the second member is one of the one or more reachable members in the group, and the first member is not one of the one or more reachable members in the group, the quantity of the one or more reachable members may be equal to the quantity of the received response messages.

With reference to the example in step S102, assuming that the terminal #1 receives a response message sent by the terminal #3 and a response message sent by the terminal #4, a quantity of reachable members in the group #1 may be 2.

S106. The V2X layer of the first terminal sends the quantity of the one or more reachable members to an AS of the first terminal. Correspondingly, the AS of the first terminal receives the quantity of the one or more reachable members.

Therefore, the AS of the first terminal can learn of a specific quantity of members located around the first terminal in the group. Specifically, when the first member is not one of the one or more reachable members in the group, the quantity of members located around the first terminal in the group is equal to the quantity of the one or more reachable members. When the first member is one of the one or more reachable members in the group, the quantity of members located around the first terminal in the group is equal to the quantity of the one or more reachable members minus 1.

Optionally, in addition to the quantity of the one or more reachable members, the V2X layer of the first terminal further sends the layer 2 identifier of the group and/or the layer 2 identifier of the first member to the AS of the first terminal.

Based on steps S101 to S106, the V2X layer of the first terminal sends the first message, to trigger members around the first member in the group to send response messages of the first message, so that the V2X layer of the first terminal can determine the quantity of the one or more reachable members based on the response messages of the first message. The V2X layer of the first terminal sends the quantity of the one or more reachable members to the AS of the first terminal. In this way, the AS of the first terminal may determine, based on the quantity of the one or more reachable members, the specific quantity of members located around the first member in the group. In this way, when the AS of the first terminal initiates a groupcast service, the AS of the first terminal determines, based on the quantity of the one or more reachable members and a quantity of received ACK messages, whether all members around the first terminal successfully receive a groupcast message, to ensure normal execution of a HARQ mechanism.

Optionally, the communication method shown in FIG. 4A and FIG. 4B further includes steps S107 to S109, as described below.

S107. The V2X layer of the first terminal sends a second message to the V2X layer of the second terminal.

The second message may be used to enable the V2X layer of the second terminal to obtain the quantity of the one or more reachable members. The second message may carry at least one of the quantity of the one or more reachable members and identifier(s) of the one or more reachable members.

The identifier(s) of the one or more reachable members may include the identifier of the first member and the identifier of the second member.

Optionally, the second message further includes the identifier of the group. In addition, when the second message does not carry the identifier(s) of the one or more reachable members, the second message may further include the identifier of the first member.

Optionally, the second message is a group information notification (group information notification). This is not limited in this embodiment of this application.

In an implementation, the V2X layer of the first terminal sends the second message in unicast mode.

In another implementation, the V2X layer of the first terminal sends the second message in groupcast/broadcast mode. It may be understood that, compared with sending in unicast mode, sending the second message in groupcast/broadcast mode helps reduce signaling overheads.

It should be noted that a sequence in which the V2X layer of the first terminal performs steps S106 and S107 is not limited in this embodiment of this application. For example, the V2X layer of the first terminal may first perform step S106 and then perform step S107, may first perform step S107 and then perform step S106, or may perform steps S106 and S107 simultaneously.

S108. The V2X layer of the second terminal obtains the quantity of the one or more reachable members based on the second message.

When the second message includes the quantity of the one or more reachable members, the V2X layer of the second terminal may directly obtain the quantity of the one or more reachable members by parsing the second message.

When the second message does not include the quantity of the one or more reachable members but includes the identifier(s) of the one or more reachable members, the V2X layer of the second terminal obtains the identifier(s) of the one or more reachable members by parsing the second message, and then the V2X layer of the second terminal determines the quantity of the one or more reachable members based on the identifier(s) of the one or more reachable members. It may be understood that the quantity of the one or more reachable members is equal to a quantity of the identifier(s) of the one or more reachable members.

For example, if the second message includes an identifier of a reachable member #1, an identifier of a reachable member #2, an identifier of a reachable member #3, and an identifier of a reachable member #4, the V2X layer of the second terminal can determine that the quantity of the reachable members is 4.

S109. The V2X layer of the second terminal sends the quantity of the one or more reachable members to an AS of the second terminal. Correspondingly, the AS of the second terminal obtains the quantity of the one or more reachable members.

Optionally, in addition to the quantity of the one or more reachable members, the V2X layer of the second terminal further sends the layer 2 identifier of the group and/or the layer 2 identifier of the second member to the AS of the second terminal.

Based on the foregoing technical solution, the V2X layer of the second terminal receives the first message, when the second member corresponding to the second terminal belongs to the group corresponding to the first message, the V2X layer of the second terminal sends the response message of the first message, so that the first terminal learns that the member corresponding to the second terminal is located near the first terminal. Then, the V2X layer of the second terminal receives the second message, and obtains the quantity of the one or more reachable members based on the second message. The V2X layer of the second terminal sends the quantity of the one or more reachable members to the AS of the second terminal. In this way, when the AS of the second terminal initiates a groupcast service, the AS of the second terminal determines, based on the quantity of the one or more reachable members and a quantity of received ACK messages, whether all members around the second terminal successfully receive a groupcast message, to ensure normal execution of the HARQ mechanism.

Figure 5A:
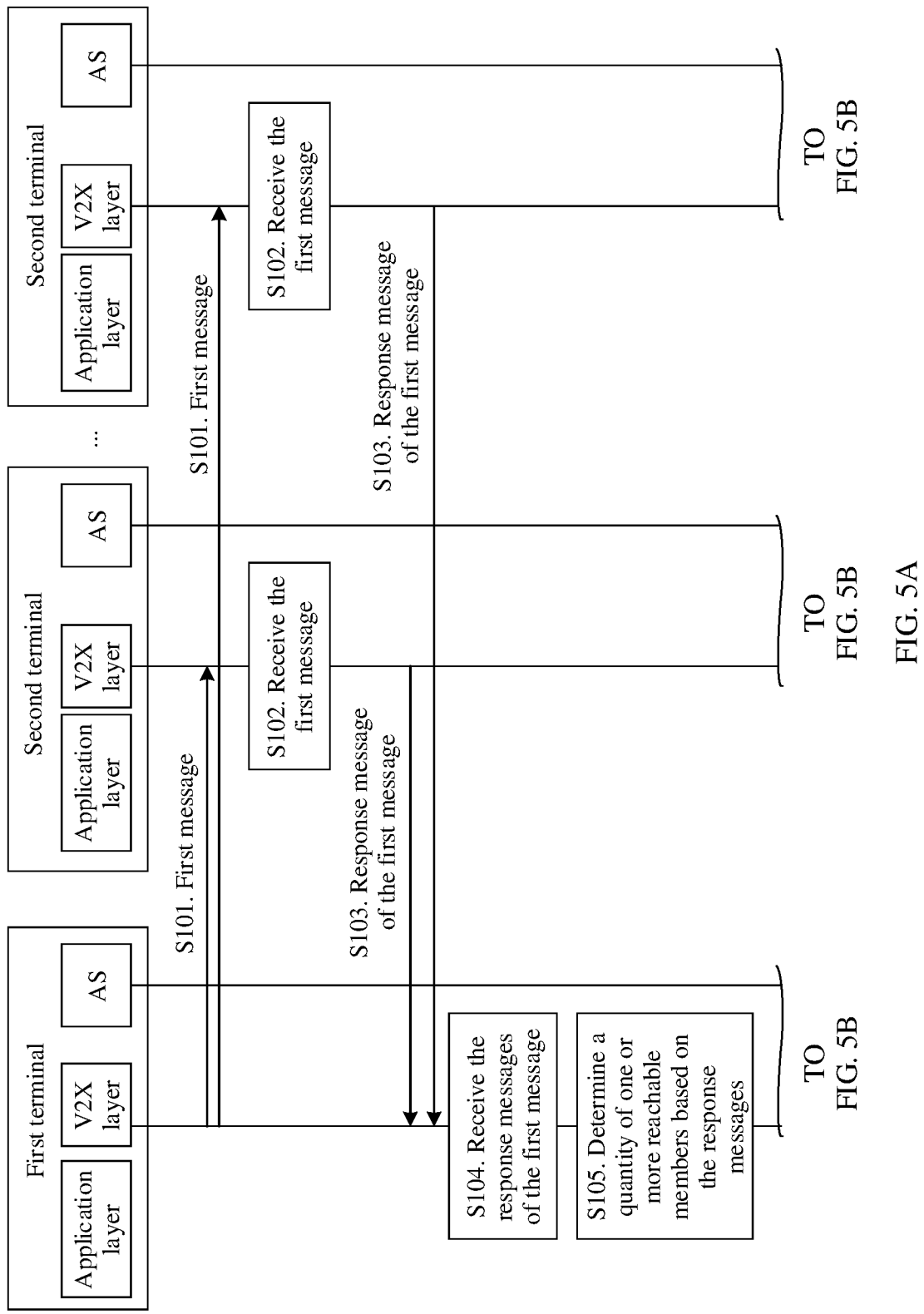
Figure 5C:
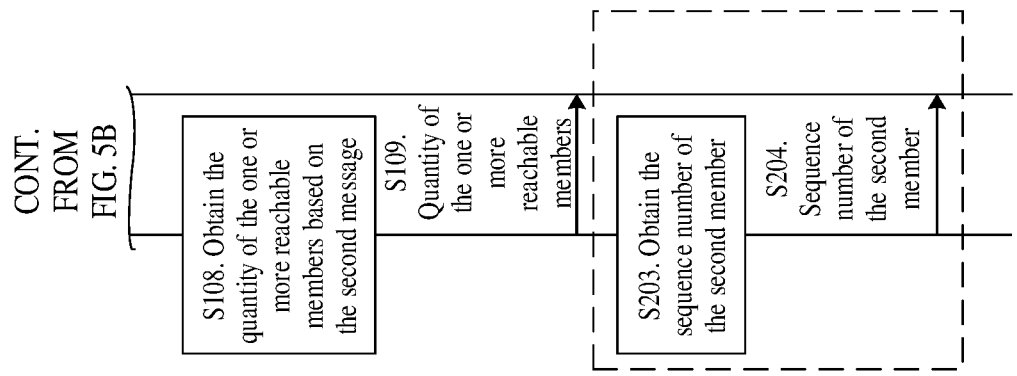
Figure 5C:
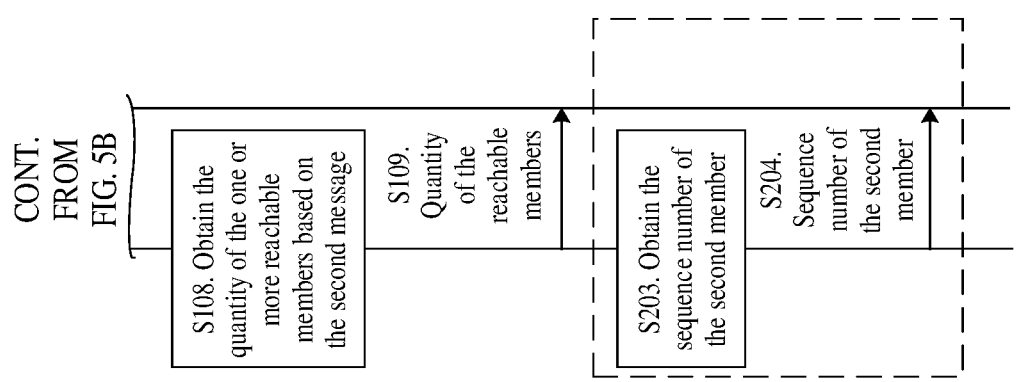
Figure 5C:
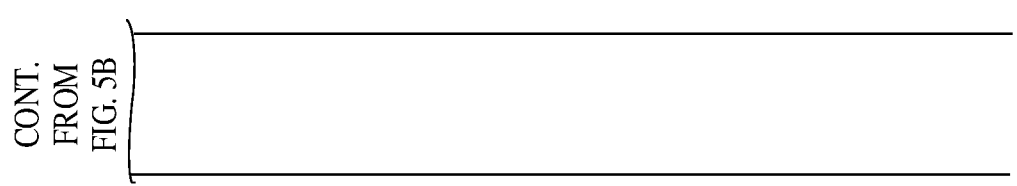

Optionally, as shown in FIG. 5A to FIG. 5C, another communication method is provided. The method is implemented based on the communication method shown in FIG. 4A and FIG. 4B. Specifically, after step S104, steps S201 and S202 are further included.

S201. The V2X layer of the first terminal obtains a sequence number of the first member.

The sequence number of the first member may be a layer 2 identifier, a layer 1 identifier, or another parameter of the first member.

It should be noted that the layer 1 identifier may be obtained by performing truncation processing on the layer 2 identifier. That is, the layer 1 identifier is a truncated layer 2 identifier. For example, it is assumed that the truncation processing means that the first 10 bits of the layer 2 identifier are truncated, and only the eleventh bit and bits after the eleventh bit of the layer 2 identifier are retained. If the layer 2 identifier of the first member is 00110011110001, the layer 1 identifier of the first member is 110001.

Optionally, if the first member is one of the one or more reachable members in the group, when the sequence number of the first member is another parameter, the V2X layer of the first terminal may use any one of the following implementations to obtain the sequence number of the first member.

Implementation 1: The V2X layer of the first terminal determines the sequence number of the first member based on value(s) of application layer identifier(s) of the one or more reachable members.

Optionally, the V2X layer of the first terminal sorts application layer identifiers of all reachable members by size, and uses a sequence number of the application layer identifier of the first member in a first arrangement order/second arrangement order as the sequence number of the first member. The first arrangement order is an ascending arrangement order of the application layer identifiers of all the reachable members. The second arrangement order is a descending arrangement order of the application layer identifiers of all the reachable members.

For example, for the first arrangement order or the second arrangement order, a start sequence number may be any natural number, for example, 0.

The following describes the foregoing implementation 1 by using an example. Assuming that an application layer identifier of a reachable member #1 is 0000, an application layer identifier of a reachable member #2 is 0011, an application layer identifier of a reachable member #3 is 0010, and an application layer identifier of a reachable member #4 is 0001, the first arrangement order may be the application layer identifier of the reachable member #1, the application layer identifier of the reachable member #4, the application layer identifier of the reachable member #3, and the application layer identifier of the reachable member #2. It is assumed that the start sequence number in the first arrangement order is 0. Therefore, a sequence number of the application layer identifier of the reachable member #1 in the first arrangement order is 0, a sequence number of the application layer identifier of the reachable member #4 in the first arrangement order is 1, a sequence number of the application layer identifier of the reachable member #3 in the first arrangement order is 2, and a sequence number of the application layer identifier of the reachable member #2 in the first arrangement order is 3. In this way, if the first member is the reachable member #3, the V2X layer of the first terminal may determine that the sequence number of the first member is 2.

Implementation 2: The V2X layer of the first terminal determines the sequence number of the first member based on value(s) of layer 2 identifier(s) of the one or more reachable members.

Optionally, the V2X layer of the first terminal sorts layer 2 identifiers of all reachable members by size, and uses a sequence number of the layer 2 identifier of the first member in a third arrangement order/fourth arrangement order as the sequence number of the first member. The third arrangement order is an ascending arrangement order of the layer 2 identifiers of all the reachable members. The fourth arrangement order is a descending arrangement order of the layer 2 identifiers of all the reachable members.

For example, for the third arrangement order or the fourth arrangement order, a start sequence number may be any natural number, for example, 0.

The following describes the foregoing implementation 2 by using an example.

Assuming that a layer 2 identifier of a reachable member #1 is 00110011100000, a layer 2 identifier of a reachable member #2 is 00110011110011, a layer 2 identifier of a reachable member #3 is 00110011111110010, and a layer 2 identifier of a reachable member #4 is 00110011111110001, the third arrangement order may be the layer 2 identifier of the reachable member #1, the layer 2 identifier of the reachable member #4, the layer 2 identifier of the reachable member #3, and the layer 2 identifier of the reachable member #2. It is assumed that the start sequence number in the third arrangement order is 0. Therefore, a sequence number of the layer 2 identifier of the reachable member #1 in the third arrangement order is 0, a sequence number of the layer 2 identifier of the reachable member #4 in the third arrangement order is 1, a sequence number of the layer 2 identifier of the reachable member #3 in the third arrangement order is 2, and a sequence number of the layer 2 identifier of the reachable member #2 in the third arrangement order is 3. In this way, if the first member is the reachable member #3, the V2X layer of the first terminal may determine that the sequence number of the first member is 2.

Implementation 3: The V2X layer of the first terminal allocates the sequence number of the first member.

A value range of the sequence number is determined based on the quantity of the one or more reachable members. For example, if the quantity of the reachable members is 10, a value of the sequence number may be selected from integers ranging from 0 to 9, or the value of the sequence number may be selected from integers ranging from 1 to 10.

It should be noted that the sequence number allocated to the first member is not allocated to another member in the one or more reachable members. That is, in the group, two different members in the one or more reachable members have different sequence numbers.

For example, assuming that the group includes 10 members, the V2X layer of the first terminal needs to allocate 10 sequence numbers, and the 10 sequence numbers may be 0, 1, 2, 3, 4, 5, 6, 7, 8, and 9. The V2X layer of the first terminal may randomly select a sequence number (for example, the sequence number 9) from the 10 sequence numbers and allocate the sequence number to the first member.

S202. The V2X layer of the first terminal sends the sequence number of the first member to an AS of the first terminal.

It should be noted that an execution sequence of steps S201 and S202 and steps S105 and S106 is not limited in this embodiment of this application. That is, the V2X layer of the first terminal may first perform steps S201 and S202 and then perform steps S105 and S106, may first perform steps S105 and S106 and then perform steps S201 and S202, or may perform steps S105 and S106 and steps S201 and S202 simultaneously.

Optionally, when the V2X layer of the first terminal simultaneously performs step S202 and step S106, the sequence number of the first member and the quantity of the one or more reachable members may be carried in a same message.

Based on steps S201 and S202, the AS of the first terminal can learn of the sequence number of the first member. Therefore, after the AS of the first terminal receives a groupcast message, the AS of the first terminal can determine a corresponding feedback resource based on the sequence number of the first member, and send an ACK/NACK message of the groupcast message based on the feedback resource. For specific details, refer to the following embodiment shown in FIG. 12.

Figure 14A:
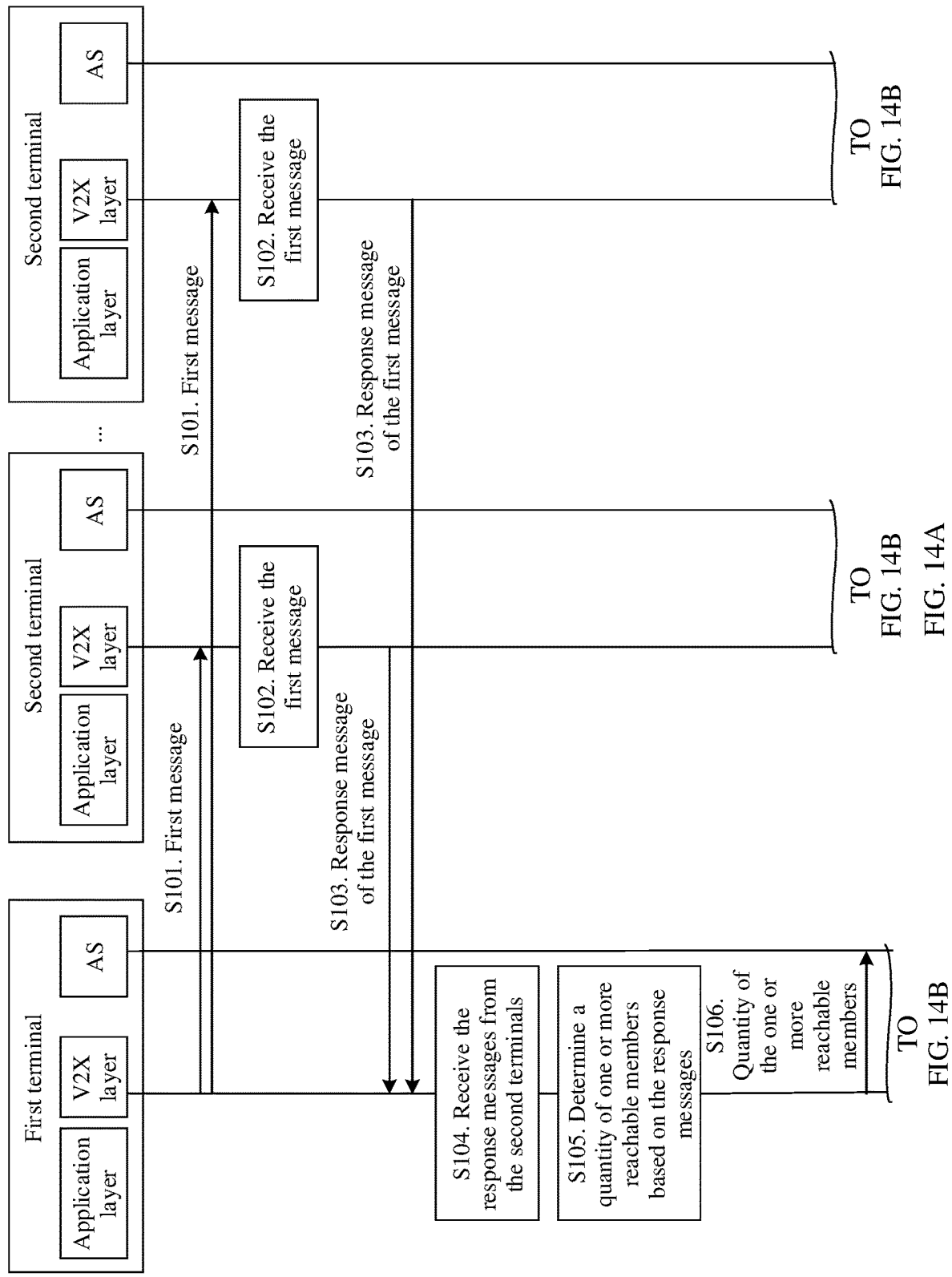
FIG. 14A and FIG. 14B are a flowchart of another communication method according to an embodiment of this application.
Figure 14B:
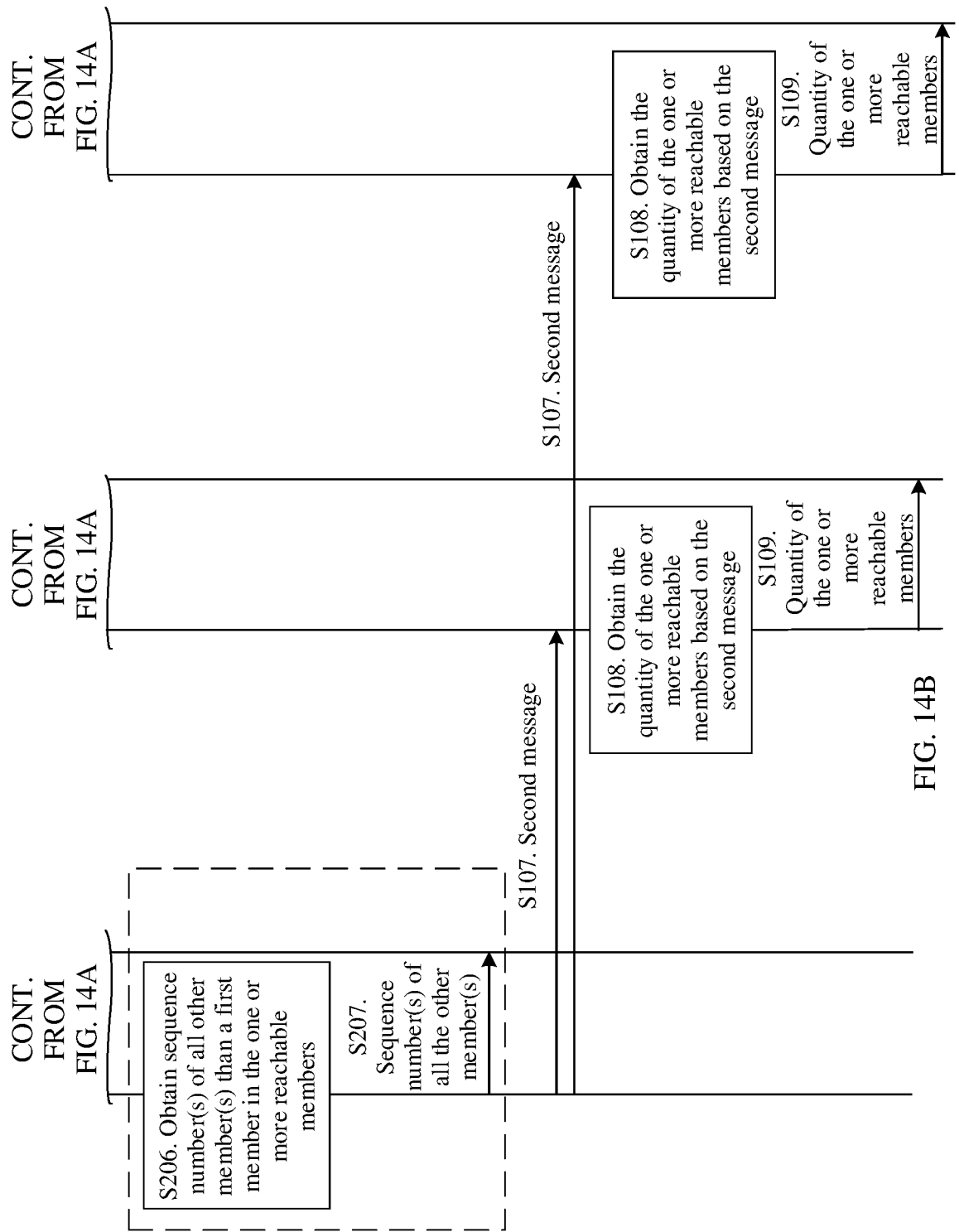

Optionally, as shown in FIG. 14A and FIG. 14B, another communication method is provided. The communication method is implemented based on the communication method shown in FIG. 4A and FIG. 4B. Specifically, after step S104, the communication method further includes steps S206 and S207.

S206. The V2X layer of the first terminal obtains sequence number(s) of all other member(s) than the first member in the one or more reachable members.

A sequence number of each of all the other member(s) may be a layer 2 identifier, a layer 1 identifier, or another parameter of the member.

Optionally, if the sequence number of each of the all the other member(s) is another parameter, the V2X layer of the first terminal may use any one of the following implementations to obtain the sequence number(s) of all the other member(s).

Implementation 1: The V2X layer of the first terminal determines the sequence number(s) of all the other member(s) based on value(s) of application layer identifier(s) of all the one or more reachable members.

Implementation 2: The V2X layer of the first terminal determines the sequence number(s) of all the other member(s) based on value(s) of layer 2 identifier(s) of all the one or more reachable members.

Implementation 3: The V2X layer of the first terminal allocates the sequence number(s) of all the other member(s).

Implementation 4: The V2X layer of the first terminal determines the sequence number(s) of all the other member(s) based on the response message. The response message includes indication information used to indicate sequence number(s) of the one or more reachable members.

For specific details of the foregoing implementation 1 to implementation 3, refer to the descriptions in step S201. Details are not described herein again.

S207. The V2X layer of the first terminal sends the sequence number(s) of all the other member(s) to an AS of the first terminal.

It should be noted that an execution sequence of steps S206 and S207 and steps S105 and S106 is not limited in this embodiment of this application. That is, the V2X layer of the first terminal may first perform steps S206 and S207 and then perform steps S105 and S106, may first perform steps S105 and S106 and then perform steps S206 and S207, or may perform steps S105 and S106 and steps S206 and S207 simultaneously.

Based on steps S206 and S207, the AS of the first terminal can learn of the sequence number(s) of all the other member(s) than the first member in all the one or more reachable members.

Optionally, the embodiment shown in FIG. 5A to FIG. 5C and the embodiment shown in FIG. 14A and FIG. 14B may be performed together, or may be separately performed. This is not limited in this application.

Optionally, as shown in FIG. 5A to FIG. 5C, after step S107, the communication method shown in FIG. 4A and FIG. 4B may further include steps S203 and S204.

S203. The V2X layer of the second terminal obtains a sequence number of the second member.

The sequence number of the second member may be a layer 2 identifier, a layer 1 identifier, or another parameter of the second member.

When the sequence number of the second member is another parameter, the V2X layer of the second terminal may obtain the sequence number of the second member based on the second message.

Optionally, the second message implicitly indicates the sequence number of the second member. For example, the second message includes the identifier(s) of the one or more reachable members.

In this way, the V2X layer of the second terminal may obtain the identifier(s) of the one or more reachable members from the second message. Then, the V2X layer of the second terminal determines the sequence number of the second member based on value(s) of application layer identifier(s)/layer 2 identifier(s) of the one or more reachable members. For a manner of determining the sequence number of the second member, refer to related descriptions in the implementation 1 or the implementation 2 in step S201.

Alternatively, a position of an identifier of a member in the second message corresponds to a sequence number of the member. Therefore, the V2X layer of the second terminal determines the sequence number of the second member based on a position of the identifier of the second member in the second message.

Figure 6:
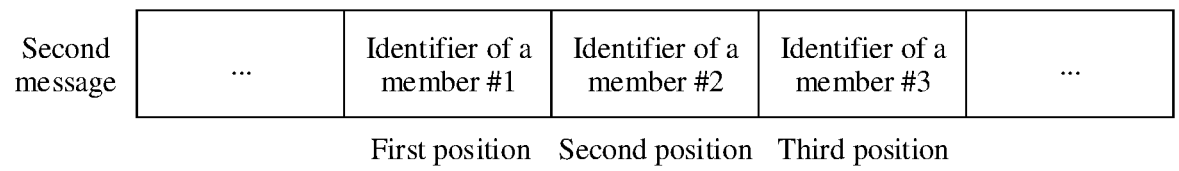
FIG. 6 is a schematic diagram of a second message according to an embodiment of this application.

Descriptions are provided by using an example with reference to FIG. 6. An identifier of a member #1 is in a first position in the second message, an identifier of a member #2 is in a second position in the second message, and an identifier of a member #3 is in a third position in the second message. The first position in the second message corresponds to a sequence number 1, the second position in the second message corresponds to a sequence number 2, and the third position in the second message corresponds to a sequence number 3. Assuming that the second member corresponding to the second terminal is the member #3, the V2X layer of the second terminal can determine that the sequence number of the second member is 3.

Optionally, the second message explicitly indicates the sequence number of the second member.

For example, the second message includes the sequence number of the second member. In this way, the V2X layer of the second terminal can directly obtain the sequence number of the second member by parsing the second message.

It should be noted that, when the second message includes only the sequence number of the second member and does not include a sequence number of another member, the V2X layer of the first terminal sends the second message to the V2X layer of the second terminal in unicast mode.

For another example, the second message may include sequence number(s) of the one or more reachable members. Alternatively, when the first member is one of the one or more reachable members in the group, the second message may further include sequence number(s) of all other member (s) than the first member in the one or more reachable members.

In a case in which the second message includes the sequence number(s) of the one or more reachable members, how the V2X layer of the second terminal determines the sequence number of the second member is specifically described below. It may be understood that, when the second message includes the sequence number(s) of all the other member(s) than the first member in the one or more reachable members, for an implementation in which the V2X layer of the second terminal determines the sequence number of the second member, refer to the following corresponding descriptions.

The second message includes the sequence number(s) of the one or more reachable members, and further includes the identifier(s) of the one or more reachable members. For any member in the one or more reachable members, a position of an identifier of the member in the second message may implicitly indicate a position of a sequence number of the member in the second message. In this way, because the V2X layer of the second terminal learns of the identifier of the second member in advance, the V2X layer of the second terminal may first determine the position of the identifier of the second member in the second message, to determine a position of the sequence number of the second member in the second message, and further determine the sequence number of the second member.

Optionally, when the second message includes the sequence number(s) of the one or more reachable members and the identifier(s) of the one or more reachable members, that a position of an identifier of a member in the second message implicitly indicates a position of a sequence number of the member in the second message includes the following two implementations.

Implementation 1: The second message includes a first information element and a second information element, the first information element is used to carry the identifier(s) of the one or more reachable members, and the second information element is used to carry sequence number(s) of the one or more reachable members. For any member in the one or more reachable members, a position of an identifier of the member in the first information element is the same as a position of a sequence number of the member in the second information element.

Based on the implementation 1, the V2X layer of the second terminal determines a position of the identifier of the second member in the first information element, to determine a position of a sequence number of the second member in the second information element. In this way, the V2X layer of the second terminal can obtain the sequence number of the second member from the second information element.

Figure 7:
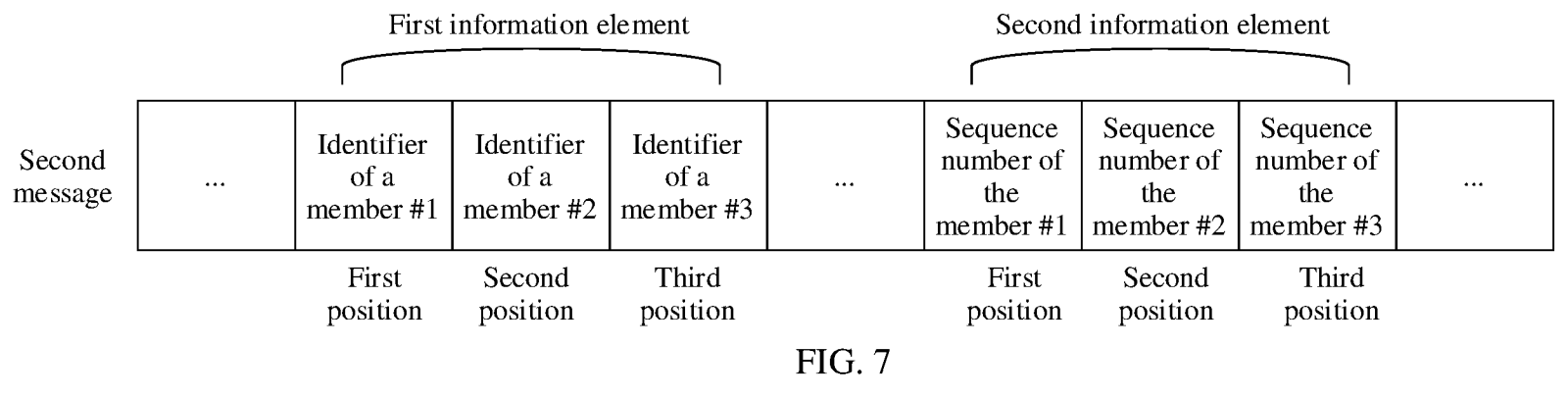

Descriptions are provided by using an example with reference to FIG. 7. As shown in FIG. 7, an identifier of a member #1 is in a first position in the first information element, an identifier of a member #2 is in a second position in the first information element, and an identifier of a member #3 is in a third position in the first information element. A sequence number of the member #1 is in a first position in the second information element, a sequence number of the member #2 is in a second position in the second information element, and a sequence number of the member #3 is in a third position in the second information element. Assuming that the second member is the member #3, the V2X layer of the second terminal first determines that the identifier of the member #3 is in the third location in the first information element, and then the V2X layer of the second terminal obtains the sequence number of the member #3 from the third location in the second information element.

Implementation 2: The second message includes M information elements, where M is equal to the quantity of the one or more reachable members. One of the M information elements corresponds to one member, and one information element is used to carry an identifier and a sequence number of a corresponding member.

Based on the implementation 2, the V2X layer of the second terminal determines an information element that is in the second message and that is used to carry the identifier of the second member, to obtain the sequence number of the second member from the information element that is in the second message and that is used to carry the identifier of the second member.

Figure 8:
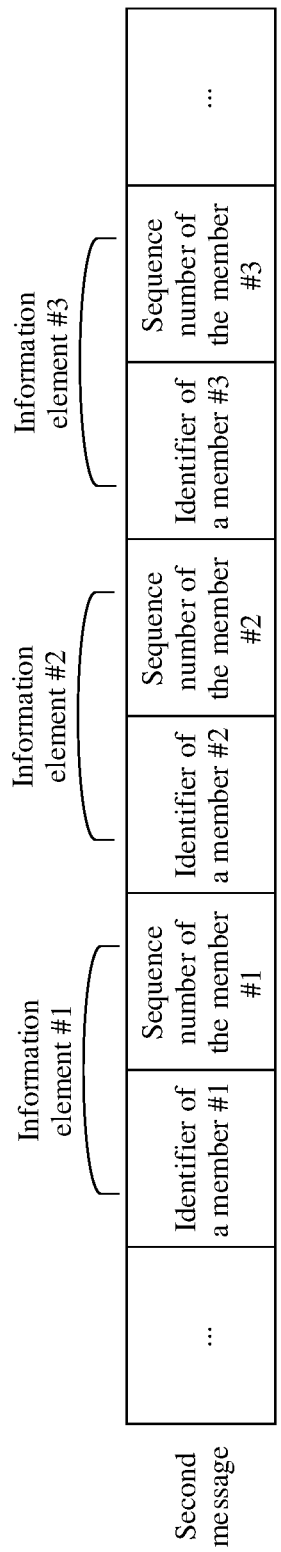
FIG. 8 is a schematic diagram of another second message according to an embodiment of this application.

Descriptions are provided by using an example with reference to FIG. 8. An identifier and a sequence number of a member #1 are carried in an information element #1 of the second message, an identifier and a sequence number of a member #2 are carried in an information element #2 of the second message, and an identifier and a sequence number of a member #3 are carried in an information element #3 of the second message. Assuming that the second member is the member #2, the V2X layer of the second terminal can determine the information element #2 based on the identifier of the member #2, and obtain the sequence number of the member #2 from the information element #2.

S204. The V2X layer of the second terminal sends the sequence number of the second member to an AS of the second terminal, so that the AS of the second terminal receives the sequence number of the second member sent by the V2X layer of the second terminal.

It should be noted that an execution sequence of steps S203 and S204 and steps S108 and S109 is not limited in this embodiment of this application. That is, the V2X layer of the second terminal may first perform steps S203 and S204 and then perform steps S108 and S109, may first perform steps S108 and S109 and then perform steps S203 and S204, or may perform steps S203 and S204 and steps S108 and S109 simultaneously.

Optionally, when the V2X layer of the second terminal simultaneously performs step S204 and step S109, the sequence number of the second member and the quantity of the one or more reachable members may be carried in a same message.

Based on steps S203 and S204, the AS of the second terminal can learn of the sequence number of the second member. Therefore, after the AS of the second terminal receives a groupcast message, the AS of the second terminal can determine a corresponding feedback resource based on the sequence number of the second member, and send an ACK/NACK message of the groupcast message based on the feedback resource. For specific details, refer to the following embodiment shown in FIG. 12.

Optionally, when the second message includes the sequence number of the second member, as shown in FIG. 5A to FIG. 5C, before step S107, the communication method further includes step S205.

S205. The V2X layer of the first terminal obtains the sequence number of the second member.

For a specific implementation in which the first terminal obtains the sequence number of the second member, refer to related descriptions in step S201. Details are not described herein again.

It should be noted that an execution sequence of step S201 and step S205 is not limited in this embodiment of this application.

Figure 9:
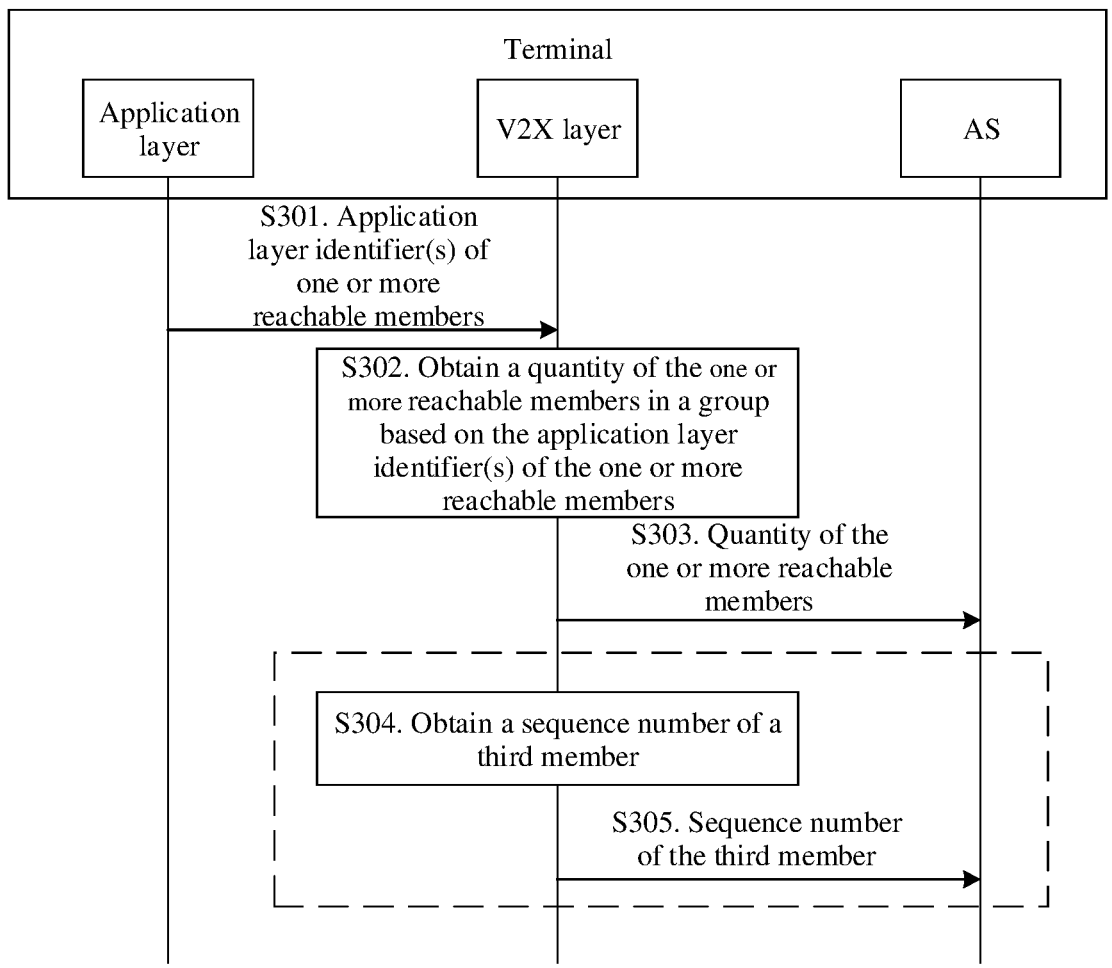
FIG. 9 is a flowchart of another communication method according to an embodiment of this application.

FIG. 9 shows a communication method provided in an embodiment of this application. The method includes the following steps.

S301. An application layer of a terminal sends application layer identifier(s) of one or more reachable members to a V2X layer of the terminal. Correspondingly, the V2X layer of the terminal receives the application layer identifier(s) of the one or more reachable members sent by the application layer of the terminal.

In this embodiment of this application, the terminal corresponds to a third member in a group. The third member may be one of the one or more reachable members in the group.

Optionally, a trigger condition for the application layer of the terminal to perform step S301 includes but is not limited to triggering a groupcast service by a V2X application of the terminal, group creation, and group update.

In an implementation, the application layer of the terminal obtains the application layer identifier(s) of the one or more reachable members in the group. Then, the application layer of the terminal sends the application layer identifier(s) of the one or more reachable members to the V2X layer of the terminal.

Optionally, that the application layer of the terminal obtains the application layer identifier(s) of the one or more reachable members in the group includes the application layer of the terminal receives the application layer identifier(s) of the one or more reachable members sent by another device (for example, an application server or a group management terminal).

The group management terminal is a terminal configured to manage a group, and has functions such as group creation, group member update, and group deletion. In other words, the group management terminal corresponds to a management member in the group. The management member is configured to manage the group, and has functions such as group creation, group member update, and group deletion.

S302. The V2X layer of the terminal obtains a quantity of the one or more reachable members based on the application layer identifier(s) of the one or more reachable members.

In an implementation, the V2X layer of the terminal collects statistics on a quantity of the application layer identifier(s) of the one or more reachable members, to obtain the quantity of the one or more reachable members. The quantity of the one or more reachable members is equal to the quantity of the application layer identifier(s) of the one or more reachable members.

For example, the V2X layer of the terminal receives an application layer identifier of a member #1, an application layer identifier of a member #3, an application layer identifier of a member #5, an application layer identifier of a member #6, and an application layer identifier of a member #7. In this case, the V2X layer of the terminal can determine that the quantity of the application layer identifiers of the reachable members is 5, and the V2X layer of the terminal determines that the quantity of the reachable members is 5.

In another implementation, the V2X layer of the terminal generates/allocates layer 2 identifier(s) of the one or more reachable members based on the application layer identifier(s) of the one or more reachable members. Then, the V2X layer of the terminal collects statistics on a quantity of the layer 2 identifier(s) of the one or more reachable members, to obtain the quantity of the one or more reachable members. The quantity of the one or more reachable members is equal to the quantity of the layer 2 identifier(s) of the one or more reachable members.

That the V2X layer of the terminal allocates the layer 2 identifier(s) of the one or more reachable members based on the application layer identifier(s) of the one or more reachable members specifically means the V2X layer of the terminal randomly allocates the layer 2 identifier(s) of the one or more reachable members.

That the V2X layer of the terminal generates the layer 2 identifier(s) of the one or more reachable members based on the application layer identifier(s) of the one or more reachable members specifically means the V2X layer of the terminal generates the layer 2 identifier(s) of the one or more reachable members based on a preset algorithm/a second correspondence and the application layer identifier(s) of the one or more reachable members. The second correspondence is a correspondence between an application layer identifier of a member and a layer 2 identifier of the member. For example, Table 2 is an example of the second correspondence. Descriptions are provided by using an example with reference to Table 2. Assuming that an application layer identifier of a member in the one or more reachable members is 1101, the V2X layer of the terminal can determine that a layer 2 identifier of the member is 11101011001001. Assuming that an application layer identifier of a member in the one or more reachable members is 1111, the V2X layer of the terminal can determine that a layer 2 identifier of the member is 111101011001101.

TABLE 2

| Application layer identifier of a member | Layer 2 identifier of the member |
| --- | --- |
| 1101 | 111101011001001 |
| 1110 | 111101011001010 |
| 1111 | 111101011001101 |
| 1100 | 111101111001001 |

S303. The V2X layer of the terminal sends the quantity of the one or more reachable members to an AS of the terminal. Correspondingly, the AS of the terminal receives the quantity of the one or more reachable members sent by the V2X layer of the terminal.

Based on steps S301 to S303, the AS of the terminal can learn of the quantity of the one or more reachable members, to ensure that the AS of the terminal can execute a HARQ mechanism in groupcast mode.

Optionally, as shown in FIG. 9, the communication method further includes steps S304 and S305.

S304. The V2X layer of the terminal obtains a sequence number of the third member.

The sequence number of the third member may be a layer 2 identifier, a layer 1 identifier, or another parameter of the third member.

Optionally, when the third member is one of the one or more reachable members in the group, if the sequence number of the third member is another parameter, the V2X layer of the terminal may determine the sequence number of the third member based on any one of the following implementations.

Implementation 1: The V2X layer of the terminal determines the sequence number of the third member based on value(s) of the application layer identifier(s) of the one or more reachable members.

Implementation 2: The V2X layer of the terminal determines the sequence number of the third member based on value(s) of the layer 2 identifier(s) of the one or more reachable members.

Implementation 3: The V2X layer of the terminal allocates the sequence number of the third member.

For details of the foregoing implementation 1 to implementation 3, refer to related descriptions in step S201 in the embodiment shown in FIG. 5A to FIG. 5C. Details are not described herein again.

Implementation 4: The V2X layer of the terminal determines the sequence number of the third member based on a location of the third member in a first list.

The first list is used to record the application layer identifier(s) or the layer 2 identifier(s) of the one or more reachable members.

Optionally, the V2X layer of the terminal determines the sequence number of the third member based on a location of an application layer identifier/a layer 2 identifier of the third member in the first list. For example, when the first list records an application layer identifier/a layer 2 identifier of one reachable member in one column/row, the V2X layer of the terminal may use a sequence number of a column/row in which the application layer identifier/layer 2 identifier of the third member is located as a sequence number of the third member.

For example, it is assumed that the first list is used to record the application layer identifier(s) of the one or more reachable members. Table 3 is an example of the first list. Assuming that the application layer identifier of the third member is 1101, it can be learned that the application layer identifier of the third member is in the first row of the first list. It is assumed that rows in the first list are sorted starting from 0, a sequence number of the first row is 0. In this way, the V2X layer of the terminal may determine that the sequence number of the third member is 0.

TABLE 3

1101
1110

TABLE 3-continued 1111
1100

For example, it is assumed that the first list is used to record the layer 2 identifier(s) of the one or more reachable members. Table 4 is an example of the first list. Assuming that the layer 2 identifier of the third member is 111110111001001, it can be learned that the layer 2 identifier of the third member is in the first row of the first list. It is assumed that rows in the first list are sorted starting from 0, a sequence number of the first row is 0. In this way, the V2X layer of the terminal may determine that the sequence number of the third member is 0.

TABLE 4

111101011001001
111101011001010
111101011001101
111101111001001

It may be understood that the method for determining the sequence number of the third member may be applied to another member in the one or more reachable members.

S305. The V2X layer of the terminal sends the sequence number of the third member to the AS of the terminal. Correspondingly, the AS of the terminal receives the sequence number of the third member sent by the V2X layer of the terminal.

It should be noted that an execution sequence of steps S302 and S303 and steps S304 and S305 is not limited in this embodiment of this application. That is, steps S302 and S303 may be first performed and then steps S304 and S305 are performed, steps S304 and S305 may be first performed and then steps S302 and S303 are performed, or steps S302 and S303 and steps S304 and S305 are performed simultaneously.

Based on steps S304 and S305, the AS of the terminal may learn of the sequence number of the third member, to ensure that after the AS of the terminal receives a groupcast message, the AS of the terminal can correctly feed back an ACK/NACK message of the groupcast message. For specific details, refer to the following embodiment shown in FIG. 12.

Figure 15:
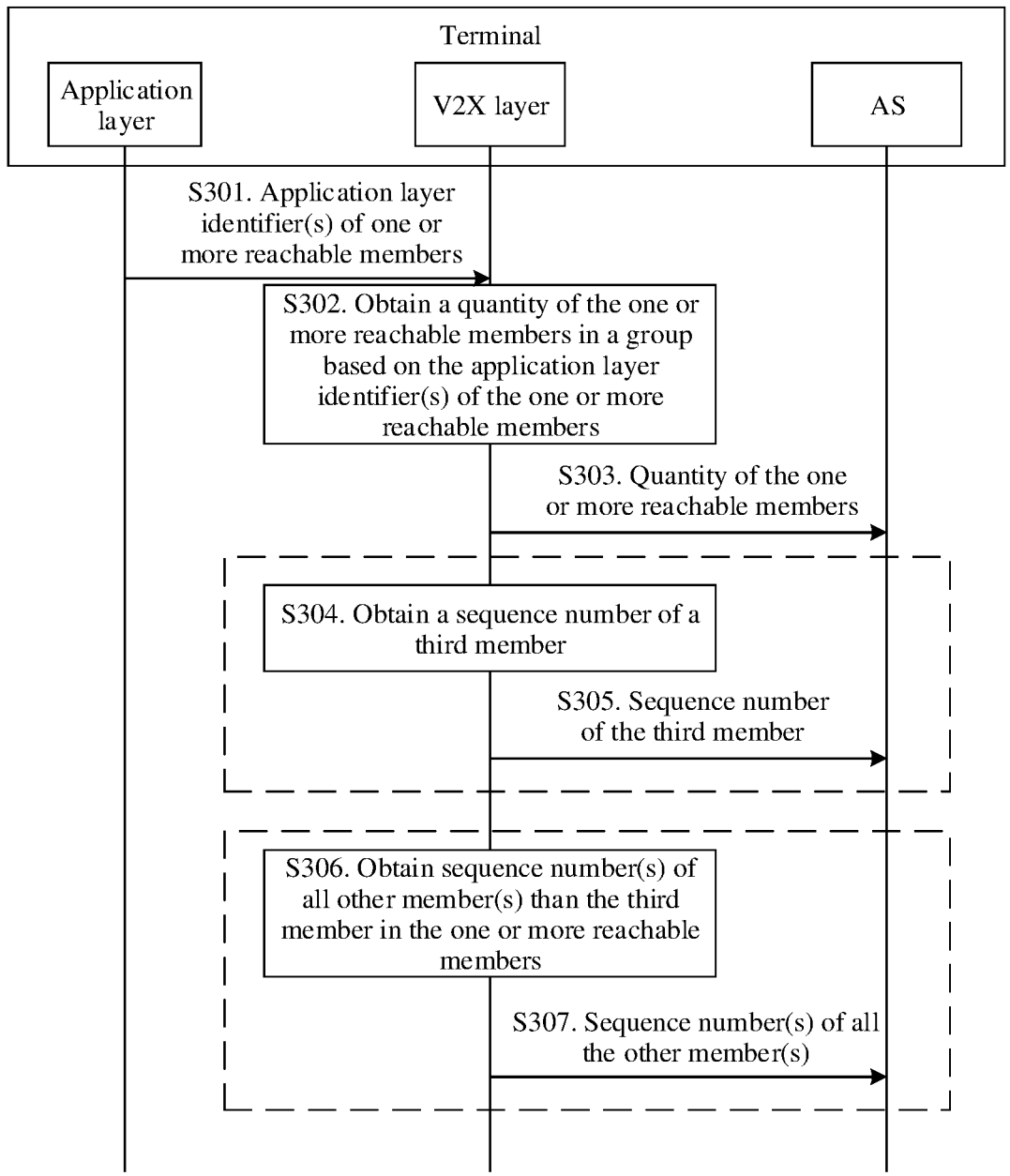
FIG. 15 is a flowchart of another communication method according to an embodiment of this application.

Optionally, as shown in FIG. 15, another communication method is provided. The communication method is implemented based on the communication method shown in FIG. 9. Specifically, after step S301, the communication method further includes steps S306 and S307.

S306. The V2X layer of the terminal obtains sequence number(s) of all other member(s) than the third member in the one or more reachable members.

A sequence number of each of all the other member(s) may be a layer 2 identifier, a layer 1 identifier, or another parameter of the member.

If the sequence number of each of the all the other member(s) is another parameter, the V2X layer of the terminal may determine the sequence number(s) of all the other member(s) based on any one of the following implementations.

Implementation 1: The V2X layer of the terminal determines the sequence number(s) of all the other member(s) based on value(s) of the application layer identifier(s) of the one or more reachable members.

Implementation 2: The V2X layer of the terminal determines the sequence number(s) of all the other member(s) based on value(s) of layer 2 identifier(s) of the one or more reachable members.

Implementation 3: The V2X layer of the terminal allocates the sequence number(s) of all the other member(s).

Implementation 4: The V2X layer of the terminal determines a sequence number of each of all the other member(s) based on a location of each of all the other member(s) in a first list.

For specific details of the foregoing implementation 1 to implementation 4, refer to the descriptions in step S304 in the embodiment shown in FIG. 9. Details are not described herein again.

S307. The V2X layer of the terminal sends the sequence number(s) of all the other member(s) than the third member in the one or more reachable members to the AS of the terminal.

It should be noted that an execution sequence of steps S302 and S303 and steps S306 and S307 is not limited in this embodiment of this application. That is, steps S302 and S303 may be first performed and then steps S306 and S307 are performed, steps S306 and S307 may be first performed and then steps S302 and S303 are performed, or steps S302 and S303 and steps S306 and S307 are performed simultaneously.

Based on steps S306 and S307, the AS of the terminal may obtain the sequence number(s) of all the other member(s) than the third member in the one or more reachable members.

Figure 10:
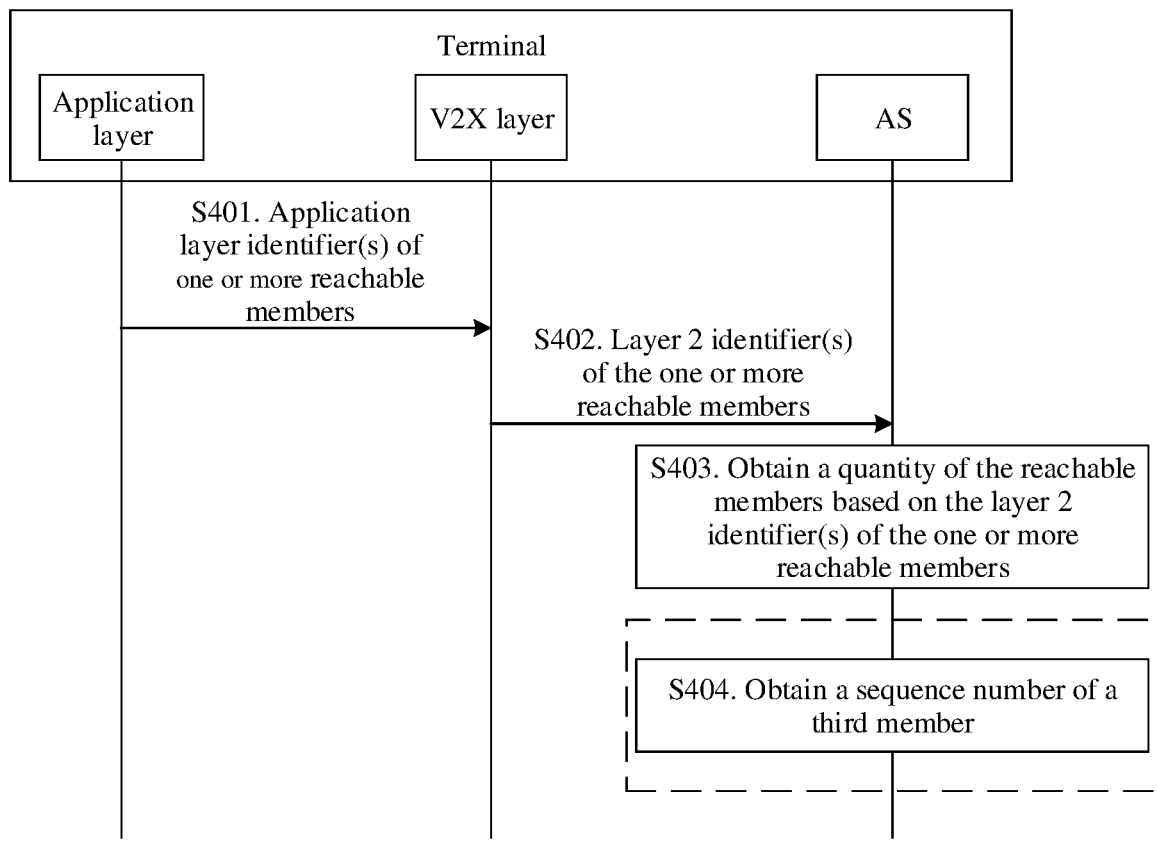
FIG. 10 is a flowchart of another communication method according to an embodiment of this application.

FIG. 10 shows a communication method provided in an embodiment of this application. The method includes the following steps.

S401. An application layer of a terminal sends application layer identifier(s) of one or more reachable members to a V2X layer of the terminal. Correspondingly, the V2X layer of the terminal receives the application layer identifier(s) of the one or more reachable members.

For specific descriptions of step S401, refer to step S301. Details are not described herein again.

S402. The V2X layer of the terminal sends layer 2 identifier(s) of the one or more reachable members to an AS of the terminal based on the application layer identifier(s) of the one or more reachable members. Correspondingly, the AS of the terminal receives the layer 2 identifier(s) of the one or more reachable members.

In an implementation, the V2X layer of the terminal generates/allocates the layer 2 identifier(s) of the one or more reachable members based on the application layer identifier(s) of the one or more reachable members. Then, the V2X layer of the terminal sends the layer 2 identifier(s) of the one or more reachable members to the AS of the terminal.

For specific descriptions of generating/allocating the layer 2 identifier(s) of the one or more reachable members by the V2X layer of the terminal, refer to related descriptions in step S301 in the embodiment shown in FIG. 9. Details are not described herein again.

S403. The AS of the terminal obtains a quantity of the one or more reachable members based on the layer 2 identifier(s) of the one or more reachable members.

The quantity of the one or more reachable members is equal to a quantity of the layer 2 identifier(s) of the one or more reachable members.

Based on steps S401 to S403, the AS of the terminal can learn of the quantity of the one or more reachable members, to ensure that the AS of the terminal can execute a HARQ mechanism in groupcast mode.

Optionally, as shown in FIG. 10, the communication method further includes steps S404.

S404. The AS of the terminal obtains a sequence number of a third member.

The sequence number of the third member may be a layer 2 identifier, a layer 1 identifier, or another parameter of the third member.

Optionally, when the third member is one of the one or more reachable members in the group, if the sequence number of the third member is another parameter, the AS of the terminal may determine the sequence number of the third member based on any one of the following implementations.

Implementation 1: The AS of the terminal determines the sequence number of the third member based on value(s) of the layer 2 identifier(s) of the one or more reachable members.

Implementation 2: The AS of the terminal allocates the sequence number of the third member.

For details of the foregoing implementation 1 and implementation 2, refer to related descriptions in step S201 in the embodiment shown in FIG. 5A to FIG. 5C. Details are not described herein again.

Implementation 3: The AS of the terminal determines the sequence number of the third member based on a location of the third member in a second list. The second list is used to record the layer 2 identifier(s) of the one or more reachable members.

For details of the foregoing implementation 3, refer to related descriptions in step S304 in the embodiment shown in FIG. 9. Details are not described herein again.

It may be understood that the method for determining the sequence number of the third member may be applied to another member in the one or more reachable members.

It should be noted that an execution sequence of step S403 and step S404 is not limited in this embodiment of this application. That is, step S403 may be first performed and then step S404 is performed, step S404 may be first performed and then step S403 is performed, or steps S403 and S404 are performed simultaneously.

Based on step S404, the AS of the terminal may learn of the sequence number of the third member, to ensure that after the AS of the terminal receives a groupcast message, the AS of the terminal can correctly feed back an ACK/NACK message of the groupcast message. For specific details, refer to the following embodiment shown in FIG. 12.

Figure 16:
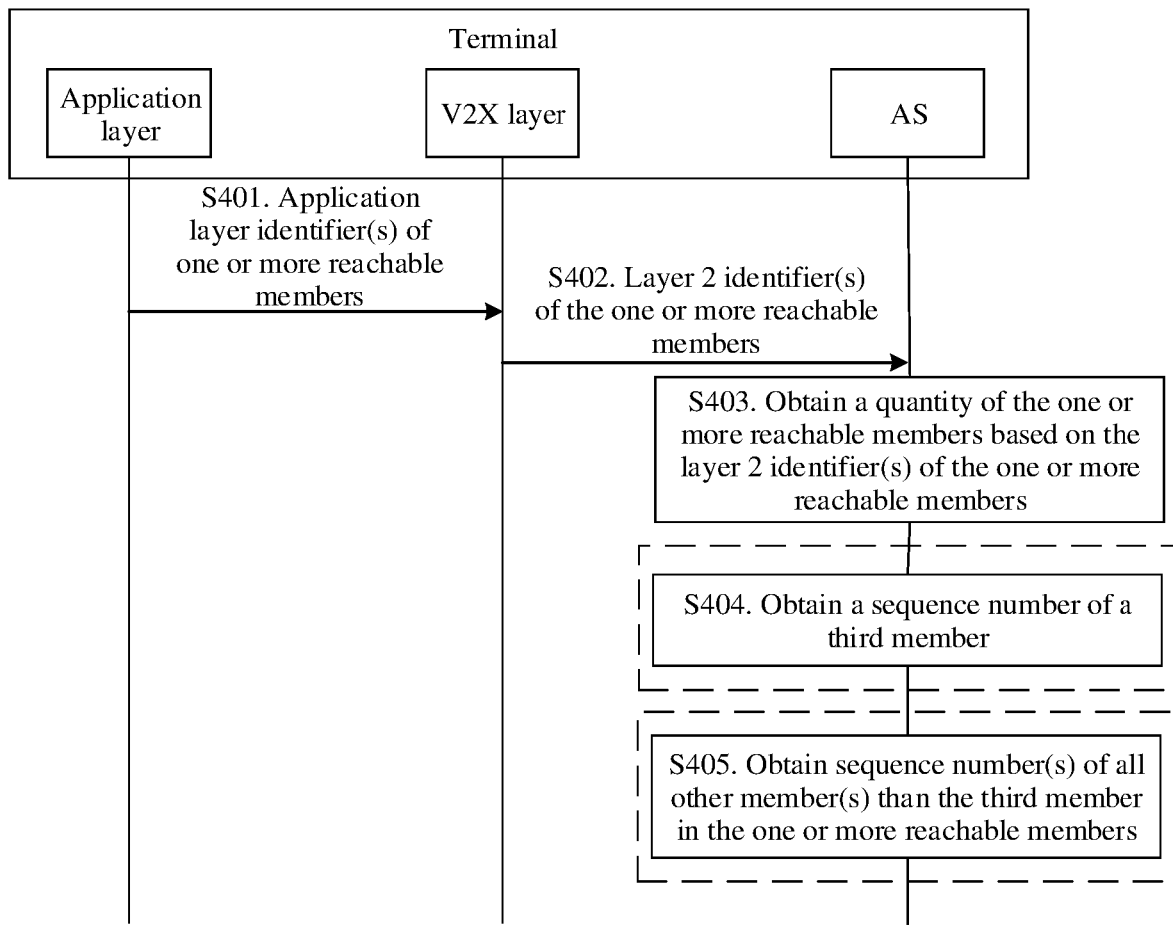
FIG. 16 is a flowchart of another communication method according to an embodiment of this application.

Optionally, as shown in FIG. 16, another communication method is provided. The communication method is implemented based on the communication method shown in FIG. 10. Specifically, after step S403, the communication method further includes step S405.

S405. The AS of the terminal obtains sequence number(s) of all other member(s) than the third member in the one or more reachable members.

A sequence number of each of all the other member(s) may be a layer 2 identifier, a layer 1 identifier, or another parameter of the member.

If the sequence number of each of all the other member(s) is another parameter, the AS of the terminal may determine the sequence number(s) of all the other member(s) based on any one of the following implementations.

Implementation 1: The AS of the terminal determines the sequence number(s) of all the other member(s) based on value(s) of the layer 2 identifier(s) of the one or more reachable members.

Implementation 2: The AS of the terminal allocates the sequence number(s) of all the other member(s).

Implementation 3: The AS of the terminal determines a sequence number of each of all the other member(s) based on a location of each of all the other member(s) in a first list.

For specific details of the foregoing implementation 1 to implementation 3, refer to the descriptions in step S404 in the embodiment shown in FIG. 10. Details are not described herein again.

Based on step S405, the AS of the terminal may learn of the sequence number(s) of all the other member(s) than the third member in the one or more reachable members.

Figure 11:
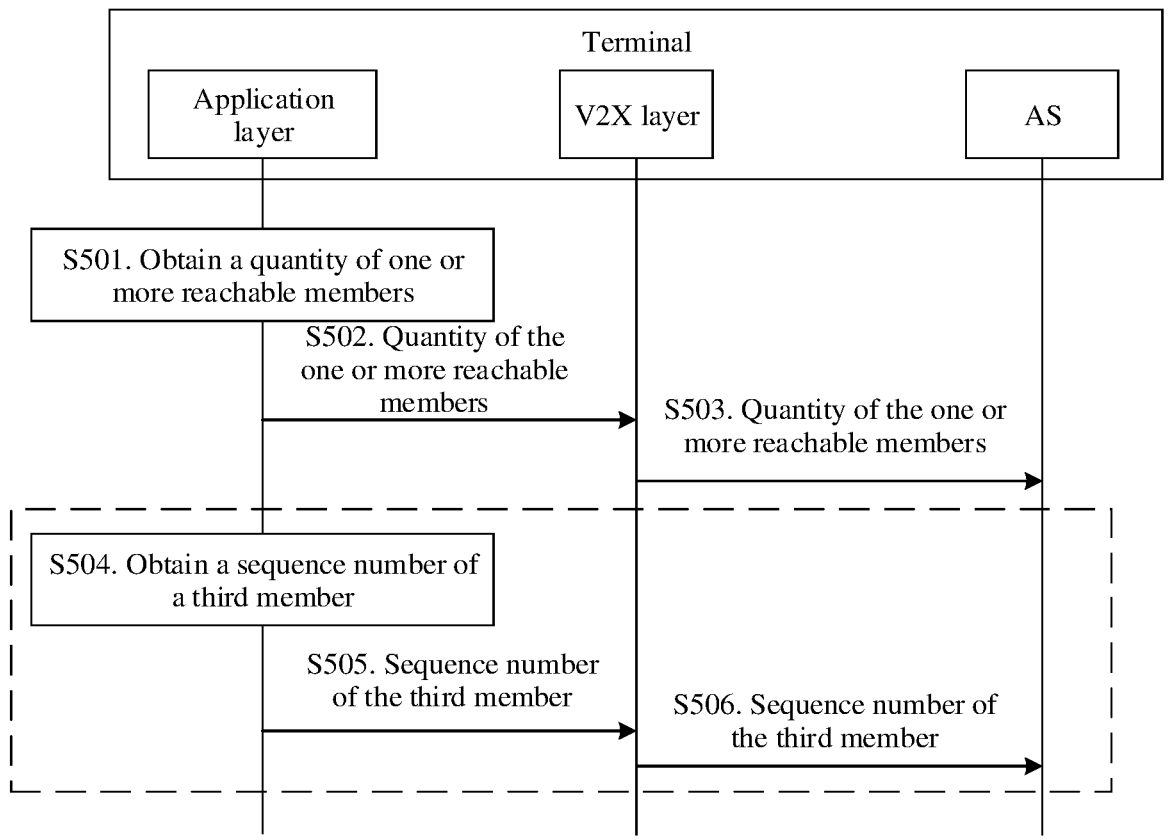
FIG. 11 is a flowchart of another communication method according to an embodiment of this application.

FIG. 11 shows a communication method provided in an embodiment of this application. The method includes the following steps.

S501. An application layer of a terminal obtains a quantity of one or more reachable members.

In this embodiment of this application, the terminal corresponds to a third member in a group.

Optionally, a trigger condition for the application layer of the terminal to perform step S501 includes but is not limited to triggering a groupcast service by a V2X application of the terminal, group creation, and group update.

In an implementation, the application layer of the terminal obtains application layer identifier(s) of the one or more reachable members. Then, the application layer of the terminal obtains the quantity of the one or more reachable members based on the application layer identifier(s) of the one or more reachable members. The quantity of the one or more reachable members is equal to a quantity of the application layer identifier(s) of the one or more reachable members.

Optionally, that the application layer of the terminal obtains the application layer identifier(s) of the one or more reachable members in the group includes the application layer of the terminal receives the application layer identifier(s) of the one or more reachable members sent by another device (for example, an application server or a group management terminal).

S502. The application layer of the terminal sends the quantity of the one or more reachable members to a V2X layer of the terminal. Correspondingly, the V2X layer of the terminal receives the quantity of the one or more reachable members.

S503. The V2X layer of the terminal sends the quantity of the one or more reachable members to an AS of the terminal. Correspondingly, the AS of the terminal receives the quantity of the one or more reachable members.

Based on steps S501 to S503, the AS of the terminal learns of the quantity of the one or more reachable members, to ensure that the AS of the terminal can normally execute a HARQ mechanism in groupcast mode.

Optionally, as shown in FIG. 11, the communication method further includes steps S504 to S506.

S504. The application layer of the terminal obtains a sequence number of the third member.

The sequence number of the third member may be a layer 2 identifier, a layer 1 identifier, or another parameter of the third member.

Optionally, when the third member is one of the one or more reachable members in the group, if the sequence number of the third member is another parameter, the application layer of the terminal may determine the sequence number of the third member based on any one of the following implementations.

Implementation 1: The application layer of the terminal determines the sequence number of the third member based on value(s) of the application layer identifier(s) of the one or more reachable members.

Implementation 2: The application layer of the terminal allocates the sequence number of the third member.

For details of the foregoing implementation 1 and implementation 2, refer to related descriptions in step S201 in the embodiment shown in FIG. 5A to FIG. 5C. Details are not described herein again.

Implementation 3: The application layer of the terminal determines the sequence number of the third member based on a location of the third member in a third list. The third list is used to record the application layer identifier(s) of the one or more reachable members.

For details of the foregoing implementation 3, refer to related descriptions in step S304 in the embodiment shown in FIG. 9. Details are not described herein again.

Implementation 4: The application layer of the terminal receives the sequence number of the third member from an application server or a group management terminal.

It may be understood that the method for determining the sequence number of the third member may be applied to another member in the one or more reachable members.

S505. The application layer of the terminal sends the sequence number of the third member to the V2X layer of the terminal. Correspondingly, the V2X layer of the terminal receives the sequence number of the third member.

S506. The V2X layer of the terminal sends the sequence number of the third member to the AS of the terminal. Correspondingly, the AS of the terminal receives the sequence number of the third member.

It should be noted that an execution sequence of steps S501 to S503 and steps S504 to S506 is not limited in this embodiment of this application. That is, steps S501 to S503 may be first performed and then steps S504 to S506 are performed, steps S504 to S506 may be first performed and then steps S501 to S503 are performed, or steps S501 to S503 and steps S504 to S506 are performed simultaneously.

Based on steps S504 to S506, the AS of the terminal may learn of the sequence number of the third member, to ensure that after the AS of the terminal receives a groupcast message, the AS of the terminal can correctly feed back an ACK/NACK message of the groupcast message. For specific details, refer to the following embodiment shown in FIG. 12.

Figure 17:
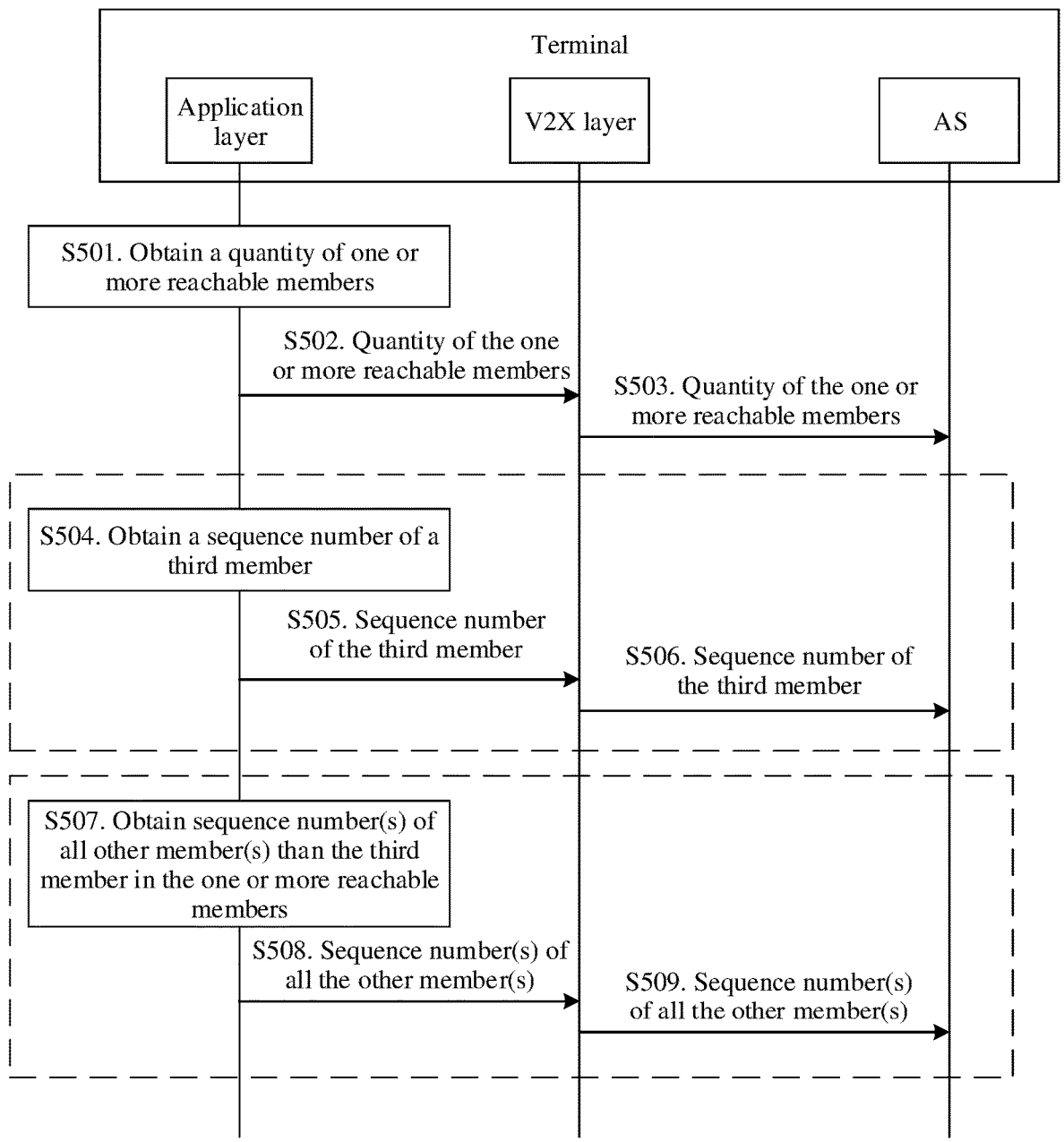
FIG. 17 is a flowchart of another communication method according to an embodiment of this application.

Optionally, as shown in FIG. 17, another communication method is provided. The communication method is implemented based on the communication method shown in FIG. 10. Specifically, the communication method further includes step S507 to S509.

S507. The application layer of the terminal obtains sequence number(s) of all other member(s) than the third member in the one or more reachable members.

A sequence number of each of all the other member(s) may be a layer 2 identifier, a layer 1 identifier, or another parameter of the member.

If the sequence number of each of the all the other member(s) is another parameter, the application layer of the terminal may determine the sequence number(s) of all the other member(s) based on any one of the following implementations.

Implementation 1: The application layer of the terminal determines the sequence number(s) of all the other reachable member(s) based on the value(s) of the application layer identifier(s) of the one or more reachable members.

Implementation 2: The application layer of the terminal allocates the sequence number(s) of all the other reachable member(s).

Implementation 3: The application layer of the terminal determines a sequence number of each of all the other member(s) based on a location of each of all the other member(s) in the third list.

Implementation 4: The application layer of the terminal receives the sequence number(s) of all the other member(s) sent by the application server or the group management terminal.

It should be noted that for specific details of the foregoing implementation 1 to implementation 4, refer to the descriptions in step S504 in the embodiment shown in FIG. 11. Details are not described herein again.

S508. The application layer of the terminal sends the sequence number(s) of all the other member(s) to the V2X layer of the terminal. Correspondingly, the V2X layer of the terminal receives the sequence number(s) of all the other member(s) sent by the application layer of the terminal.

S509. The V2X layer of the terminal sends the sequence number(s) of all the other member(s) to the AS of the terminal. Correspondingly, the AS of the terminal receives the sequence number(s) of all the other member(s) sent by the V2X layer of the terminal.

It should be noted that an execution sequence of steps S501 to S503 and steps S507 to S509 is not limited in this embodiment of this application. That is, steps S501 to S503 may be first performed and then steps S507 to S509 are performed, steps S507 to S509 may be first performed and then steps S501 to S503 are performed, or steps S501 to S503 and steps S507 to S509 are performed simultaneously.

In the embodiment shown in FIG. 9, FIG. 10, or FIG. 11, the application layer of the terminal may send an application layer identifier of the group to the V2X layer of the terminal. Then, the V2X layer of the terminal generates/allocates a layer 2 identifier of the group based on the application layer identifier of the group, and sends the layer 2 identifier of the group to the AS of the terminal. In this way, the AS of the terminal learns of the layer 2 identifier of the group. Therefore, the groupcast message sent by the AS of the terminal may include the layer 2 identifier of the group, to indicate the group corresponding to the groupcast message.

In the embodiment shown in FIG. 9, FIG. 10, or FIG. 11, when the third member is not one of the one or more reachable members in the group, the application layer of the terminal further sends the application layer identifier of the third member to the V2X layer of the terminal, the V2X layer of the terminal generates/allocates the layer 2 identifier of the third member based on the application layer identifier of the third member, then, the V2X layer of the terminal sends the layer 2 identifier of the third member to the AS of the terminal. In this way, the AS of the terminal learns of the layer 2 identifier of the third member. Therefore, when the AS of the terminal sends a groupcast message, the layer 2 identifier of the third member may be used as a source address in the groupcast message.

Figure 12:
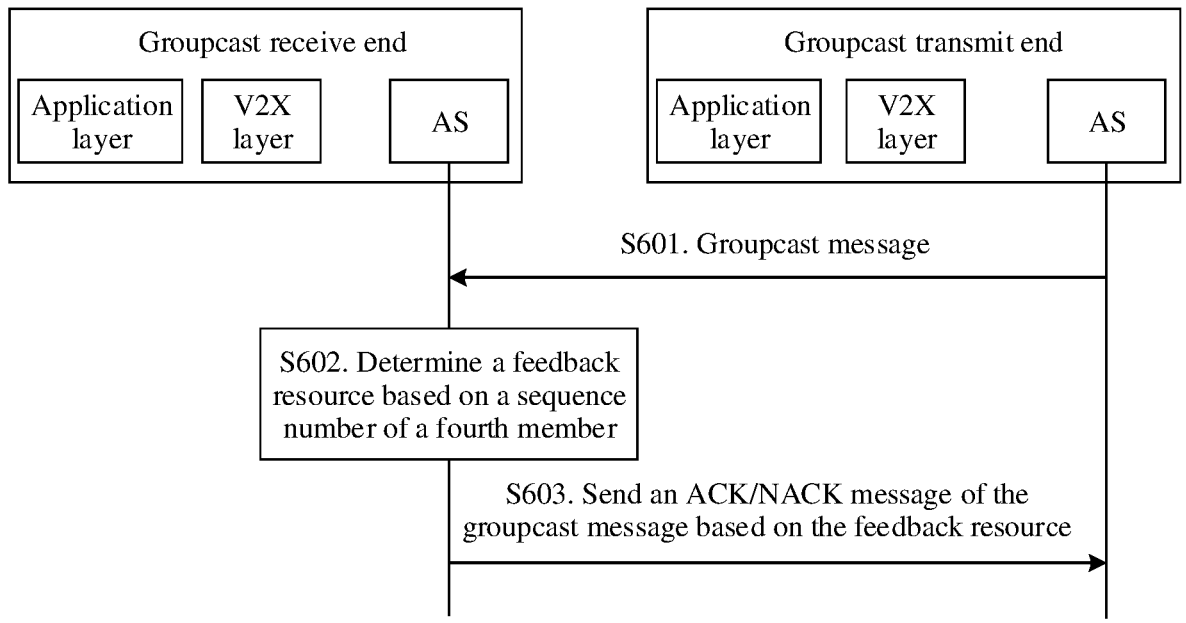
FIG. 12 is a flowchart of another communication method according to an embodiment of this application.

The following uses the embodiment shown in FIG. 12 to specifically describe a function of a sequence number of a member corresponding to a terminal.

FIG. 12 shows a communication method provided in an embodiment of this application. The method includes the following steps.

S601. An AS of a groupcast receive end receives a groupcast message sent by an AS of a groupcast transmit end.

The groupcast message may include an identifier of a group.

It may be understood that the groupcast receive end may be the first terminal/second terminal in the embodiment shown in FIG. 4A and FIG. 4B or FIG. 5A to FIG. 5C, or may be the terminal in the embodiment shown in FIG. 9, FIG. 10, or FIG. 11.

The groupcast receive end corresponds to a fourth member in the group. It may be understood that if the groupcast receive end is the first terminal in the embodiment shown in FIG. 4A and FIG. 4B or FIG. 5A to FIG. 5C, the fourth member is the first member. If the groupcast receive end is the second terminal in the embodiment shown in FIG. 4A and FIG. 4B or FIG. 5A to FIG. 5C, the fourth member is the second member. If the groupcast receive end is the terminal in the embodiment shown in FIG. 9, FIG. 10, or FIG. 11, the fourth member is the third member.

S602. The AS of the groupcast receive end determines a feedback resource based on a sequence number of the fourth member.

The feedback resource is used to carry an ACK/NACK message of the groupcast message. The feedback resource includes a time domain resource, a frequency domain resource, a space domain resource, and/or a code domain resource.

The time domain resource includes one or more time units, and the time units may be subframes, slots, orthogonal frequency division multiplexing (orthogonal frequency division multiplexing, OFDM) symbols, or the like.

The frequency domain resource includes one or more frequency domain units, and the frequency domain units may be subcarriers or bandwidths.

The space domain resource includes a beam and an antenna port.

The code domain resource may be symbol sequences that do not affect each other in same time domain position and same frequency domain position.

In this embodiment of this application, a correspondence exists between a sequence number of a member and a feedback resource. In other words, a sequence number of a member is used to determine a feedback resource corresponding to the member.

Optionally, that a correspondence exists between a sequence number of a member and a feedback resource specifically means that a correspondence exists between a sequence number of a member and an index/name/identifier/sequence number of a feedback resource.

For example, Table 5 is an example of a correspondence between a sequence number of a member and an index of a feedback resource. Descriptions are provided by using an example with reference to Table 5. It is assumed that a sequence number of the fourth member is 2. Therefore, the AS of the terminal sends the ACK/NACK message on a feedback resource whose index is 2.

TABLE 5

| Sequence number of a reachable member | Index of a feedback resource |
| --- | --- |
| 0 | 0 |
| 1 | 1 |
| 2 | 2 |
| 3 | 3 |

It may be understood that the correspondence between a sequence number of a member and a feedback resource may exist implicitly. For example, a member whose sequence number is 0 corresponds to the first feedback resource, a member whose sequence number is 1 corresponds to the second feedback resource, and so on. Details are not described again.

Alternatively, the correspondence between a sequence number of a member and a feedback resource may exist explicitly. Optionally, in this case, the groupcast transmit end may send, in broadcast/groupcast mode, the correspondence between a sequence number of a member and a feedback resource to the groupcast receive end.

S603. The AS of the groupcast receive end sends an ACK/NACK message of the groupcast message based on the feedback resource.

When the AS of the groupcast receive end receives the complete groupcast message, the AS of the groupcast receive end sends an ACK message of the groupcast message based on the feedback resource, so that the AS of the groupcast transmit end learns that the AS of the groupcast receive end has received the complete groupcast message.

When the AS of the groupcast receive end does not receive the groupcast message or receives an incomplete groupcast message, the AS of the groupcast receive end sends a NACK message of the groupcast message based on the feedback resource, to trigger the AS of the groupcast transmit end to resend the groupcast message.

Based on the technical solution shown in FIG. 12, the AS of the groupcast receive end receives a sequence number of a corresponding member based on a groupcast mode, and determines a corresponding feedback resource, to ensure that the AS of the groupcast receive end can normally feed back an ACK/NACK message to the groupcast transmit end. In addition, the groupcast transmit end does not need to configure a corresponding feedback resource for each member in the one or more reachable members. This reduces signaling overheads and reduces implementation complexity of a groupcast procedure.

In the embodiment shown in FIG. 12, the AS of the groupcast transmit end stores the correspondence between a sequence number of a member and a feedback resource. Therefore, the AS of the groupcast transmit end may determine, based on an index of the feedback resource on which the received ACK/NACK message is located, a sequence number of a member that feeds back the ACK/NACK message. Correspondingly, the AS of the groupcast transmit end may also determine, based on an index of a feedback resource on which no ACK/NACK message is transmitted, a sequence number of a member that does not feed back an ACK/NACK message.

Optionally, the AS of the groupcast transmit end may send, in unicast mode, content carried in the groupcast message to the member that does not feed back the ACK/NACK message based on the sequence number of the member that does not feed back the ACK/NACK message.

It may be understood that the AS of the groupcast transmit end or the AS of the groupcast receive end may obtain the sequence number of the member. For details, refer to the embodiments shown in FIG. 5A to FIG. 5C, FIG. 9, FIG. 10, and FIG. 14A to FIG. 17.

In a possible design, sequence number(s) of one or more reachable members obtained by the terminal may be sequence number(s) generated previously, instead of sequence number(s) generated again during each time of obtaining. For example, for a group with 20 members, generated sequence number of the members is 1, 2, 3, . . . , and 20. If the terminal finds five reachable members, previous sequence numbers of the five reachable members in the group are 1, 5, 7, 13, and 18. In this case, the terminal may determine that the sequence numbers of the five reachable members are 1, 5, 7, 13, and 18, instead of re-allocating sequence numbers 1, 2, 3, 4, and 5 to the five reachable members.

In another possible design, sequence number(s) of one or more reachable members obtained by the terminal may be sequence number(s) regenerated during each of obtaining. For a group with 20 members, generated sequence number of the members is 1, 2, 3, . . . , and 20. If the terminal finds five reachable members, previous sequence numbers of the five reachable members in the group are 1, 5, 7, 13, and 18. The terminal may re-allocate sequence numbers 1, 2, 3, 4, and 5 to the five reachable members. Therefore, the terminal may determine that the sequence numbers of the five reachable members are 1, 2, 3, 4, and 5.

The foregoing two designs may apply to any one of the embodiments in this specification.

The foregoing mainly describes the solutions provided in the embodiments of this application from a perspective of the methods. It can be understood that, to implement the foregoing functions, the terminal includes corresponding hardware structures and/or software modules for performing the functions. A person skilled in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal may be divided into function modules based on the foregoing method examples. For example, each function module may be obtained through division based on a corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division manner in an actual implementation. The following provides descriptions by using an example in which each function module is obtained through division based on a corresponding function.

Figure 13:
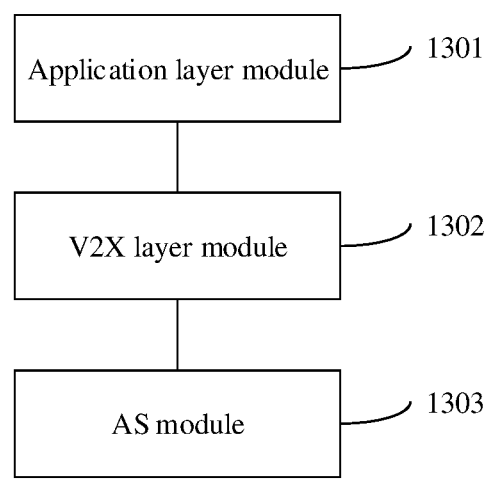
FIG. 13 is a schematic diagram of a structure of a communication apparatus according to an embodiment of this application.

FIG. 13 is a schematic diagram of a structure of a communication apparatus according to an embodiment of this application. As shown in FIG. 13, the communication apparatus includes an application layer module 1301, a V2X module 1302, and an AS module 1303. The application layer module 1301 may be configured to support the communication apparatus in performing step S301 in FIG. 9, step S401 in FIG. 10, and steps S501, S502, S504, and S505 in FIG. 5A to FIG. 5C, and/or is configured to support other processes in the technical solutions described in this specification. The V2X layer module 1302 may be configured to support the communication apparatus in performing steps S101 to S109 in FIG. 4A and FIG. 4B, steps S201 to S205 in FIG. 5A to FIG. 5C, steps S301 to S305 in FIG. 9, steps S401 and S402 in FIG. 10, and steps S502, S503, S505, and S506 in FIG. 11, and/or is configured to support other processes in the technical solutions described in this specification. The AS module 1303 may be configured to support the communication apparatus in performing step S106 or S109 in FIG. 4A and FIG. 4B, step S202 or S204 in FIG. 5A to FIG. 5C, steps S303 and S305 in FIG. 9, steps S402 to S404 in FIG. 10, steps S503 and S506 in FIG. 11, and steps S6oi to S603 in FIG. 12, and/or is configured to support other processes in the technical solutions described in this specification.

An embodiment of this application further provides a computer-readable storage medium. The computer-readable storage medium stores instructions. When the instructions are executed, the methods in the foregoing method embodiments are performed.

An embodiment of this application further provides a computer program product including instructions. When the instructions are executed, the methods in the foregoing method embodiments are performed.

An embodiment of this application further provides a chip system. The chip system includes a processor, configured to implement the technical methods in the embodiments of the present invention. In a possible design, the chip system further includes a memory, configured to store program instructions and/or data necessary for the communication device in the embodiments of the present invention. In a possible design, the chip system further includes a memory, and the processor invokes application program code stored in the memory. The chip system may include one or more chips, or may include a chip and another discrete device. This is not specifically limited in the embodiments of this application.

An embodiment of this application further provides a communication system. The communication system includes a first terminal and a second terminal. The first terminal is configured to perform the communication method shown in FIG. 4A and FIG. 4B or FIG. 5A to FIG. 5C. The second terminal is configured to perform the communication method shown in FIG. 4A and FIG. 4B or FIG. 5A to FIG. 5C.

The method or algorithm steps described with reference to the content disclosed in this application may be implemented by hardware, or may be implemented by a processor executing software instructions. The software instruction may include a corresponding software module. The software module may be stored in a RAM, a flash memory, a ROM, an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to the processor, so that the processor can read information from the storage medium and write information into the storage medium. Certainly, the storage medium may alternatively be a component of the processor. The processor and the storage medium may be located in an ASIC. In addition, the ASIC may be located in a core network interface device. Certainly, the processor and the storage medium may exist in the core network interface device as discrete components. Alternatively, the memory may be coupled to the processor. For example, the memory may exist independently, and is connected to the processor by using a bus. The memory may alternatively be integrated with the processor. The memory may be configured to store application program code for executing the technical solutions provided in the embodiments of this application, and the processor controls the execution. The processor is configured to execute the application program code stored in the memory, to implement the technical solutions provided in the embodiments of this application.

The foregoing description about the implementations allows a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in another manner. For example, the described apparatus embodiment is merely an example. For example, the division into the modules or units is merely logical function division, and may be other division in actual implementation. For example, a plurality of units or components may be combined, or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, the functional units in the embodiments of this application may be integrated into one processing unit, or each of the units may exist alone physically, or two or more of the units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:
1. A communication method, comprising:
receiving, by an access stratum (AS) of a terminal, a groupcast message, wherein the terminal corresponds to a member in a group;

determining, by the AS of the terminal, a feedback resource based on a sequence number of the member;

sending, by the AS of the terminal, an acknowledgement (ACK)/negative acknowledgement (NACK) message of the groupcast message based on the feedback resource;

receiving, by the terminal, a second message comprising data indicating a quantity of one or more reachable members in the group, wherein each reachable member in the group is a member, including the terminal, that responds to the groupcast message by sending an ACK/NACK message to a second terminal; and obtaining, by the terminal, according to the data in the second message, the quantity of the one or more reachable members in the group.

2. The communication method according to claim 1, wherein the feedback resource carries the ACK/NACK message.

3. The communication method according to claim 1, wherein an index of the feedback resource corresponds to the sequence number of the member.

4. The communication method according to claim 1, further comprising:

obtaining, by an application layer of the terminal, the sequence number of the member;

sending, by the application layer of the terminal, the sequence number of the member to a vehicle-to-everything (V2X) layer of the terminal; and sending, by the V2X layer of the terminal, the sequence number of the member to the AS of the terminal.

5. The communication method according to claim 4, wherein the obtaining the sequence number of the member comprises performing at least one of:

determining, by the application layer of the terminal, the sequence number of the member based on one or more values of one or more application layer identifiers of one or more reachable members in the group; or allocating, by the application layer of the terminal, the sequence number of the member; or receiving, by the application layer of the terminal, the sequence number of the member from at least one of an application server or a group management terminal.

6. The communication method according to claim 1, further comprising:

sending, by an application layer of the terminal, the quantity of the one or more reachable members to a vehicle-to-everything (V2X) layer of the terminal; and sending, by the V2X layer of the terminal, the quantity of the one or more reachable members to the AS of the terminal.

7. The communication method according to claim 6, wherein the obtaining the quantity of the one or more reachable members in the group comprises performing at least one of:

obtaining, by the application layer of the terminal, one or more application layer identifiers of the one or more reachable members, and determining the quantity of the one or more reachable members based on the one or more application layer identifiers of the one or more reachable members; or receiving, by the application layer of the terminal, the quantity of the one or more reachable members from at least one of an application server or a group management terminal.

8. The communication method according to claim 6, wherein the member is one of the one or more reachable members.

9. A communication apparatus, comprising:

an access stratum (AS), configured to:

receive a groupcast message, wherein the communication apparatus corresponds to a member in a group;

determine a feedback resource based on a sequence number of the member; and send an acknowledgement (ACK)/negative acknowledgement (NACK) message of the groupcast message based on the feedback resource; and an application layer, configured to:

receive a second message comprising data indicating a quantity of one or more reachable members in the group, wherein each reachable member in the group is a member, including the communications apparatus, that responds to the groupcast message by sending an ACK/NACK message to a second terminal; and obtain, according to the data in the second message, the quantity of the one or more reachable members in the group.

10. The communication apparatus according to claim 9, wherein the feedback resource carries the ACK/NACK message.

11. The communication apparatus according to claim 9, wherein an index of the feedback resource corresponds to the sequence number of the member.

12. The communication apparatus according to claim 9, further comprising a vehicle-to-everything (V2X) layer;

wherein the application layer is configured to obtain the sequence number of the member, and to send the sequence number of the member to the V2X layer; and wherein the V2X layer is configured to send the sequence number of the member to the AS.

13. The communication apparatus according to claim 12, wherein the application layer is further configured to perform at least one of:

determine the sequence number of the member based on one or more values of one or more application layer identifiers of one or more reachable members in the group;

allocate the sequence number of the member; or receive the sequence number of the member from at least one of an application server or a group management terminal.

14. The communication apparatus according to claim 9, further comprising:

a vehicle-to-everything (V2X) layer;

wherein the application layer is further configured to send the quantity of the one or more reachable members to the V2X layer; and wherein the V2X layer is configured to send the quantity of the one or more reachable members to the AS.

15. The communication apparatus according to claim 14, wherein the application layer is further configured to perform at least one of:

obtain one or more application layer identifiers of the one or more reachable members, and determine the quantity of the one or more reachable members based on the one or more application layer identifiers of the one or more reachable members; or receive the quantity of the one or more reachable members from at least one of an application server or a group management terminal.

16. The communication apparatus according to claim 14, wherein the member is one of the one or more reachable members.

17. A non-transitory computer-readable storage medium, storing computer instructions for execution by a terminal for implementation of an access stratum (AS) of the terminal and an application layer of the terminal, the computer instructions including instructions for:
- receiving a groupcast message, wherein the terminal corresponds to a member in a group;
- determining a feedback resource based on a sequence number of the member; and
- sending an acknowledgement (ACK)/negative acknowledgement (NACK) message of the groupcast message based on the feedback resource;
- receiving a second message comprising data indicating a quantity of one or more reachable members in the group, wherein each reachable member in the group is a member, including the terminal, that responds to the groupcast message by sending an ACK/NACK message to a second terminal; and
- obtaining, according to the data in the second message, the quantity of the one or more reachable members in the group.

18. The medium according to claim 17, wherein the feedback resource carries the ACK/NACK message.

19. The medium according to claim 17, wherein the computer instructions further include instructions for:
- receiving the sequence number of the member from a vehicle-to-everything (V2X) layer of the terminal.

20. The medium according to claim 17, wherein the computer instructions further include instructions for:
- receiving a quantity of one or more reachable members in the group from a V2X layer of the terminal.

* * * * *